United States Patent
Kinumatsu et al.

(10) Patent No.: US 11,409,233 B2
(45) Date of Patent: Aug. 9, 2022

(54) IMAGE FORMING APPARATUS AND PROCESS CARTRIDGE

(71) Applicant: CANON KABUSHIKI KAISHA, Tokyo (JP)

(72) Inventors: Tetsuya Kinumatsu, Shizuoka (JP); Mariko Yamashita, Shizuoka (JP); Daisuke Yoshiba, Shizuoka (JP); Michiyo Sekiya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 17/103,730

(22) Filed: Nov. 24, 2020

(65) Prior Publication Data

US 2021/0165364 A1    Jun. 3, 2021

(30) Foreign Application Priority Data

Nov. 29, 2019   (JP) .............................. JP2019-216285

(51) Int. Cl.
| | |
|---|---|
| *G03G 21/16* | (2006.01) |
| *G03G 21/18* | (2006.01) |
| *C08G 64/06* | (2006.01) |
| *G03G 5/05* | (2006.01) |
| *G03G 9/08* | (2006.01) |
| *G03G 9/087* | (2006.01) |

(52) U.S. Cl.
CPC ......... *G03G 21/1814* (2013.01); *C08G 64/06* (2013.01); *G03G 5/0564* (2013.01); *G03G 9/0823* (2013.01); *G03G 9/0825* (2013.01); *G03G 9/08757* (2013.01); *G03G 2217/0058* (2013.01)

(58) Field of Classification Search
CPC .... G03G 5/043; G03G 5/0564; G03G 5/0629; G03G 5/14; G03G 9/0823; G03G 9/0825; G03G 9/08757; G03G 21/1814; G03G 2217/0058; C08G 64/06
See application file for complete search history.

(56) References Cited

U.S. PATENT DOCUMENTS

2005/0058927 A1   3/2005   Mikuriya et al.
2014/0255836 A1*  9/2014   Nakata ................ G03G 5/0607
                                                    430/71

(Continued)

FOREIGN PATENT DOCUMENTS

EP       2977818 A1    1/2016
JP    2009122717 A     6/2009
(Continued)

*Primary Examiner* — Hoang X Ngo
(74) *Attorney, Agent, or Firm* — Canon U.S.A., Inc., IP Division

(57) ABSTRACT

An image forming apparatus comprising an electrophotographic photosensitive member and a developing device for supplying a toner onto the electrophotographic photosensitive member, the developing device having the toner, wherein the electrophotographic photosensitive member has a surface layer comprising a binder resin (A), the toner has a toner particle, the toner particle has a core comprising a binder resin (B) and a wax and a shell layer formed on a surface of the core, the binder resin (A) has a prescribed structure: the wax comprises a prescribed monoester compound: and a process cartridge.

12 Claims, 1 Drawing Sheet

(56) References Cited

U.S. PATENT DOCUMENTS

| | | | |
|---|---|---|---|
| 2015/0185635 A1* | 7/2015 | Noguchi | G03G 5/142 430/131 |
| 2015/0185637 A1* | 7/2015 | Nishi | C07D 471/06 546/66 |
| 2016/0124328 A1 | 5/2016 | Kawahara et al. | |
| 2017/0090310 A1 | 3/2017 | Katsuhara et al. | |

FOREIGN PATENT DOCUMENTS

| | | | |
|---|---|---|---|
| JP | 2011248249 A | 12/2011 | |
| JP | 2015141235 A | 8/2015 | |
| JP | 2015169800 A | 9/2015 | |
| JP | 2015175877 A | 10/2015 | |
| JP | 2017097161 A | 6/2017 | |
| JP | 2017125879 A | 7/2017 | |
| JP | 6250637 B2 | 12/2017 | |
| JP | 2018013589 A | 1/2018 | |
| JP | 2019095679 A | 6/2019 | |
| WO | 2014157424 A1 | 10/2014 | |

* cited by examiner

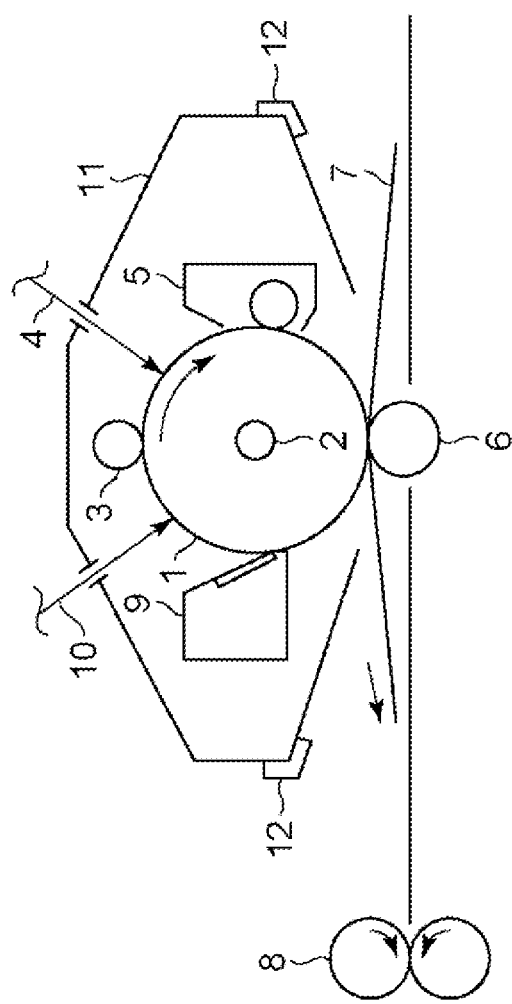

IMAGE FORMING APPARATUS AND PROCESS CARTRIDGE

BACKGROUND OF THE INVENTION

Field of the Invention

The present disclosure relates to an image forming apparatus and a process cartridge.

Description of the Related Art

Image forming apparatuses (electrophotographic apparatuses) using an electrophotographic method are required to have environmental stability, longer life, lower energy consumption, and smaller size, and in order to meet these requirements, further improvement in various performances also in toners and electrophotographic photosensitive members (hereinafter, also simply referred to as "photosensitive members") are needed.

In particular, in image forming apparatuses (electrophotographic apparatuses), it is important to stably provide high-quality images regardless of various usage environments and duration of usage. In a severe environment such as continuous use under a high-temperature and high-humidity environment, the photosensitive member is likely to be affected, hence high environmental stability and durability thereof are desired. Meanwhile, the toner is required to have further improved low-temperature fixing performance from the viewpoint of speeding up and energy saving.

To address these problems, generally, a charge-generating substance and a charge transport substance are bound to a binder resin of the photosensitive member, and the durability of the photosensitive member can be improved by hardening the binder resin. Japanese Patent Application Publication No. 2015-169800 proposes a photosensitive member in which durability and oil crack resistance are improved by improving a binder resin.

Regarding low-temperature fixability, it is important to first create a state of easier fusing, with the binder resin of the toner being plasticized during fixing. In particular, there are various means for improving the low-temperature fixability, and generally, the low-temperature fixability can be improved by using a toner having a binder resin that is designed to be easily plasticizable.

However, with this method, the resin is soft even when it is not fixed, and a problem with environmental stability, especially with regard to storage stability in a high-temperature environment, is evident. Japanese Patent Application Publication No. 2018-13589 proposes a toner having a low-temperature fixability improved by adding a crystalline material to the toner. Further, WO 2014/157424 proposes a toner having hot offset resistance and low-temperature fixability that are improved by using a predetermined monoester compound.

Further, to reduce the size, it is effective to reduce the number of parts. For example, according to Japanese Patent Application Publication No. 2017-97161, size reduction is achieved by eliminating a cleaning blade.

SUMMARY OF THE INVENTION

As a result of a study, the present inventors have found that when the method described in Japanese Patent Application Publication No. 2015-169800 is used continuously for a long time in a high-temperature and high-humidity environment, there is a concern that the image quality may be deteriorated due to contamination of the photosensitive member. Such deterioration of image quality is particularly likely to occur when a crystalline material such as described in Japanese Patent Application Publication No. 2018-13589 is used as a plasticizer. Therefore, there is still a problem in obtaining low-temperature fixability and high image quality in a high-temperature and high-humidity environment over a long period of time.

Further, the toner described in WO 2014/157424 has a problem that image quality deterioration caused by a photosensitive member is likely to occur in continuous use for a long time in a high-temperature and high-humidity environment.

Further, in the image forming apparatus disclosed in Japanese Patent Application Publication No. 2017-97161, the physical properties required for the toner and the photosensitive member are further increased, but in a case where a cleaning blade or a paper dust collecting mechanism is removed, as described in Japanese Patent Application Publication No. 2017-97161, in the examples of Japanese Patent Application Publication No. 2015-169800, Japanese Patent Application Publication No. 2018-13589, and WO 2014/157424, the problem of durability becomes more prominent.

The present disclosure provides an image forming apparatus and a process cartridge that achieve low-temperature fixability and environmental stability at the same time.

The present inventors have found that the above problems can be solved by using a photosensitive member using a binder resin having a specific structure, and a toner having a toner particle that has a core-shell structure and comprises a wax comprising a monoester compound having a specific structure.

That is, the image forming apparatus of the present disclosure is an image forming apparatus comprising:
an electrophotographic photosensitive member; and
a developing device for supplying a toner onto the electrophotographic photosensitive member, the developing device having the toner, wherein
the electrophotographic photosensitive member has a surface layer comprising a binder resin (A),
the toner has a toner particle,
the toner particle has a core-shell structure having:
a core comprising a binder resin (B) and a wax; and
a shell layer formed on a surface of the core,
the binder resin (A) has:
a structure represented by a following formula (1); and
a structure represented by a following formula (2):

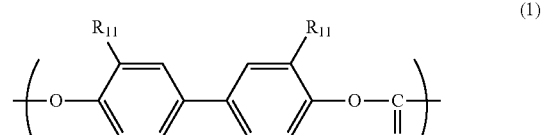

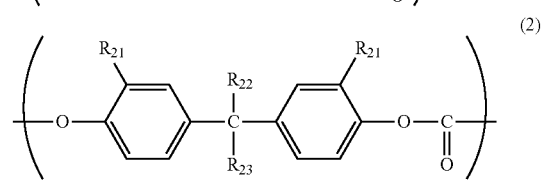

where, $R_{11}$ and $R_{21}$ each independently represent a hydrogen atom or a methyl group. $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group, the wax comprises a monoester compound represented by a following formula (3):

where, $R_{31}$ and $R_{32}$ each independently represent an alkyl group having 10 to 30 carbon atoms.

In addition, the process cartridge of the present disclosure is process cartridge attached detachably to a main body of an image forming apparatus, the process cartridge comprising:
an electrophotographic photosensitive member; and
a developing device for supplying a toner onto the electrophotographic photosensitive member, the developing device having the toner, wherein
the electrophotographic photosensitive member has a surface layer comprising a binder resin (A),
the toner has a toner particle;
the toner particle has a core-shell structure having:
a core comprising a binder resin (B) and a wax; and
a shell layer formed on a surface of the core,
the binder resin (A) has:
a structure represented by a following formula (1); and
a structure represented by a following formula (2):

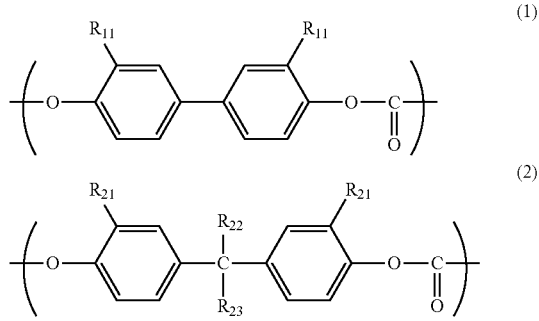

where, $R_{11}$ and $R_{21}$ each independently represent a hydrogen atom or a methyl group. $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group, and the wax comprises a monoester compound represented by a following formula (3):

where, $R_{31}$ and $R_{32}$ each independently represent an alkyl group having 10 to 30 carbon atoms.

According to the present disclosure, an image forming apparatus and a process cartridge that achieve low-temperature fixability and environmental stability at the same time can be provided.

Further features of the present invention will become apparent from the following description of exemplary embodiments with reference to the attached drawings.

BRIEF DESCRIPTION OF THE DRAWINGS

The FIGURE is a schematic diagram of an example of an image forming apparatus.

DESCRIPTION OF THE EMBODIMENTS

In the present disclosure, the expression "from XX to YY" or "XX to YY" indicating a numerical range means a numerical range including a lower limit and an upper limit, which are endpoints, unless otherwise specified.

A monomer unit, as referred to herein, represents the reacted form of a monomer substance in a polymer. For example, one segment of a carbon-carbon bond in the main chain obtained by polymerizing a vinyl-based monomer in a polymer is considered as one unit.

A crystalline resin or crystalline material, as referred to herein, means a resin or material that exhibits a clear endothermic peak in differential scanning calorimetry.

Hereinafter, embodiments of the present disclosure will be described in more detail, but the present invention is not limited thereto.

The present inventors have found that the above problems can be solved by using a photosensitive member using a binder resin having a specific structure, and a toner having a toner particle that has a core-shell structure and comprises a wax comprising a monoester compound having a specific structure.

That is, the image forming apparatus of the present disclosure is an image forming apparatus comprising:
an electrophotographic photosensitive member; and
a developing device for supplying a toner onto the electrophotographic photosensitive member, the developing device having the toner, wherein
the electrophotographic photosensitive member has a surface layer comprising a binder resin (A),
the toner has a toner particle,
the toner particle has a core-shell structure having:
a core comprising a binder resin (B) and a wax; and
a shell layer formed on a surface of the core,
the binder resin (A) has:
a structure represented by a following formula (1); and
a structure represented by a following formula (2):

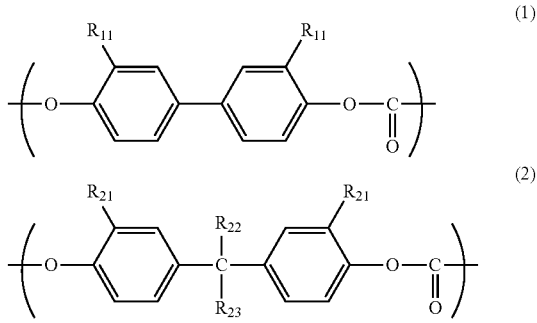

where, $R_{11}$ and $R_{21}$ each independently represent a hydrogen atom or a methyl group. $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group, the wax comprises a monoester compound represented by a following formula (3):

where, $R_{31}$ and $R_{32}$ each independently represent an alkyl group having 10 to 30 carbon atoms.

In addition, the process cartridge of the present disclosure is a process cartridge attached detachably to a main body of an image forming apparatus, the process cartridge comprising:
an electrophotographic photosensitive member; and
a developing device for supplying a toner onto the electrophotographic photosensitive member, the developing device having the toner, wherein
the electrophotographic photosensitive member has a surface layer comprising a binder resin (A),
the toner has a toner particle;
the toner particle has a core-shell structure having:
a core comprising a binder resin (B) and a wax; and
a shell layer formed on a surface of the core,
the binder resin (A) has:
a structure represented by a following formula (1); and
a structure represented by a following formula (2):

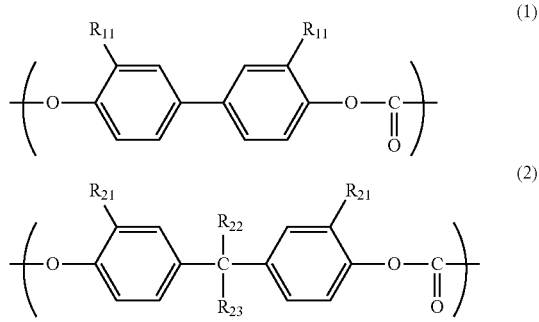

where, $R_{11}$ and $R_{21}$ each independently represent a hydrogen atom or a methyl group. $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group, and
the wax comprises a monoester compound represented by a following formula (3):

where, $R_{31}$ and $R_{32}$ each independently represent an alkyl group having 10 to 30 carbon atoms.

By using a toner having a toner particle that has a core-shell structure and comprises a wax comprising a monoester compound represented by the formula (3) in combination with a photosensitive member having the outer surface comprising a binder resin (A) having a structure represented by the formula (1) and a structure represented by the formula (2), it is possible to maintain, as appropriate, the affinity between the photosensitive member and the wax. The affinity is the compatibility between the wax and the photosensitive member, and exerts an effect on the toner adsorbability and releasability.

Since the affinity between the photosensitive member and the wax is not too high, it is possible to prevent the wax from adhering to the photosensitive member even when the wax oozes out to the toner particle surface in a high-temperature and high-humidity environment. Further, since the affinity is not too low, it is possible to prevent the sharpness of the image from being lowered due to the rolling of the toner during transfer.

Here, the "surface layer" is a layer located on the outermost surface side of the photosensitive member, and the outer surface of the surface layer is in contact with the toner.

The binder resin (A) has a structure represented by the following formula (1) and a structure represented by the following formula (2).

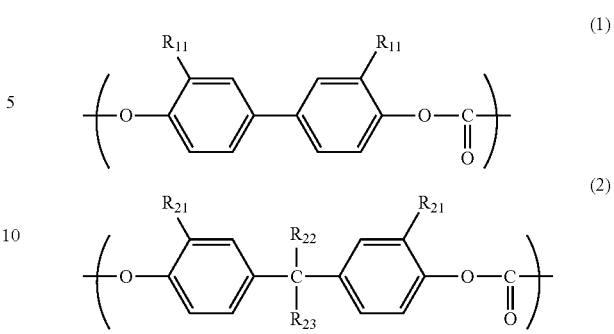

Where, $R_{11}$ and $R_{21}$ each independently represent a hydrogen atom or a methyl group. $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group.

The carbon number of the cycloalkylidene group is not particularly limited, but is preferably from 4 to 12, and more preferably from 5 to 8.

By comprising the binder resin (A) having the structure represented by the formula (1) and the structure represented by the formula (2) in the surface layer of the photosensitive member, abrasion due to rubbing of the photosensitive member is suppressed, and it is possible to maintain electrical characteristics while improving durability.

Where the binder resin (A) does not have the structure represented by the formula (1), the durability is impaired and the image quality deteriorates during continuous use. Further, when the binder resin (A) does not have the structure represented by the formula (2), the deterioration of electrical characteristics leads to the deterioration of image quality.

From the viewpoint of durability and electrical characteristics, the molar ratio of the structure represented by the formula (1) to the structure represented by the formula (2) [(the structure represented by the formula (1)):(the structure represented by the formula (2))] in the binder resin (A) is preferably from 25/75 to 70/30, and more preferably from 25/75 to 50/50.

The weight average molecular weight (Mw) of the binder resin (A) is preferably from 10,000 to 300,000, and more preferably from 20,000 to 200,000. The Mw can be controlled by the polymerization conditions such as the blending ratio of the monomers and the reaction temperature.

The binder resin (A) may be a random copolymer in which the structure represented by the formula (1) and the structure represented by the formula (2) are randomly copolymerized. Further, the binder resin (A) may be an alternating copolymer in which the structure represented by the formula (1) and the structure represented by the formula (2) are alternately copolymerized. Further, the binder resin (A) may be a periodic copolymer in which at least one structure represented by formula (1) and at least one structure represented by formula (2) are periodically copolymerized. Furthermore, the binder resin (A) may be a block copolymer in which a block having at least one structure represented by formula (1) and a block having at least one structure represented by formula (2) are copolymerized.

A method for producing the binder resin (A) is not particularly limited as long as the resin having the structure represented by the formula (1) and the structure represented by the formula (2) can be produced. Examples of the production method include a method for interfacial condensation polymerization of a diol compound for forming the structure represented by the formula (1), a diol compound for forming the structure represented by the formula (2), and phosgene, a method of transesterifying the diol compounds and diphenyl carbonate, and the like.

More specific example is a method of interfacial condensation polymerization of a mixture obtained by mixing a diol compound represented by a following formula (1') and a diol compound represented by a following formula (2'), and phosgene.

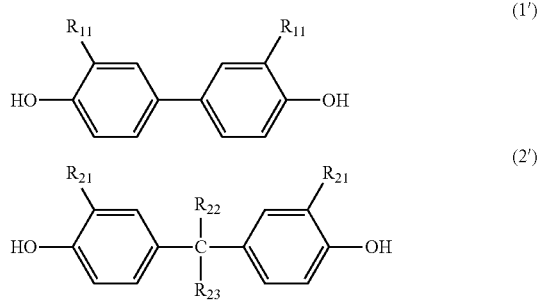

Where, $R_{11}$ and $R_{21}$ each independently represent a hydrogen atom or a methyl group. $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2') to form a cycloalkylidene group.

The toner comprises a toner particle. The toner particle comprises a binder resin (B) and a wax. The wax comprises a monoester compound represented by a following formula (3) (hereinafter, also simply referred to as "monoester compound").

Where, $R_{31}$ and $R_{32}$ each independently represent an alkyl group having 10 to 30 carbon atoms.

By comprising the monoester compound, it is possible to provide an image forming apparatus and a process cartridge in which low-temperature fixability and environmental stability are achieved at the same time.

When the ester compound in the wax is composed only of a compound having at least two ester groups, the affinity between the wax with the binder resin (A) becomes too high, so that toner adsorption easily occurs, and adhesion of the wax to the photosensitive member is likely to occur in a high-temperature and high-humidity environment, resulting in deterioration of image quality such as blank dots due to contamination of the photosensitive member.

Further, when the wax does not have an ester group, the affinity with the binder resin (A) becomes too low, and the toner easily rolls when in contact with the medium at the time of transfer in a high-temperature and high-humidity environment. As a result, the sharpness of the image is lost and the image quality is degraded.

In the monoester compound, the carbon numbers represented by $R_{31}$ and $R_{32}$ in the formula (3) are each independently preferably from 15 to 25, and more preferably from 18 to 22. $R_{31}$ and $R_{32}$ may be the same or different.

The number of carbon atoms contained in one molecule of the monoester compound is preferably from 36 to 44, and more preferably from 38 to 42.

Examples of the aliphatic alcohol that can be used for producing the monoester compound include 1-hexanol, 1-heptanol, 1-octanol, 1-nonanol, 1-decanol, undecyl alcohol, lauryl alcohol, myristyl alcohol, 1-hexadecanol, stearyl alcohol, arachidyl alcohol, behenyl alcohol, lignoceryl alcohol, and the like.

Examples of the aliphatic carboxylic acid that can be used for producing the monoester compound include pentanoic acid, hexanoic acid, heptanoic acid, octanoic acid, nonanoic acid, decanoic acid, lauric acid, myristic acid, palmitic acid, stearic acid, arachidic acid, behenic acid, lignoceric acid, and the like.

Specific examples of the monoester compound include behenyl stearate ($C_{17}H_{35}$—COO—$C_{22}H_{45}$), eicosyl eicosanate ($C_{19}H_{39}$—COO—$C_{20}H_{41}$), stearyl behenate ($C_{21}H_{43}$—COO—$C_{18}H_{37}$), behenyl behenate ($C_{21}H_{43}$—COO—$C_{22}H_{45}$), hexadecyl lignocerate ($C_{23}H_{47}$—COO—$C_{16}H_{33}$), and the like. Among these monoester compounds, behenyl stearate and stearyl behenate are more preferable.

Where the wax comprises a monoester compound represented by the formula (3) as a main component, the effect of the present invention can be easily obtained. Specifically, the amount of the monoester compound in the wax is preferably from 50% by mass to 100% by mass, and more preferably from 95% by mass to 100% by mass.

Further, the hydroxyl value of the monoester compound is preferably not more than 10 mg KOH/g, more preferably not more than 6 mg KOH/g, and further preferably not more than 3 mg KOH/g. The hydroxyl value can be, for example, at least 0.0 mg KOH/g. When the hydroxyl value is within the above range, the storage stability is further improved.

Further, the acid value of the monoester compound is preferably not more than 1.0 mg KOH/g, more preferably not more than 0.6 mg KOH/g, and further preferably not more than 0.3 mg KOH/g. The acid value can be, for example, at least 0.0 mg KOH/g. When the acid value is within the above range, the storage stability is further improved.

The toner preferably contains the wax in an amount of 1.0 to 30.0% by mass, more preferably 1.0 to 20.0% by mass, and even more preferably 7.0 to 13.0% by mass. When the amount is at least 1.0% by mass, the effect of the present invention can be stably obtained. Meanwhile, when the amount is not more than 30.0% by mass, compatibility with storage stability can be achieved.

Also, the wax may include other wax in addition to the monoester compound.

Specific examples of other waxes include the following.

Aliphatic hydrocarbons such as low-molecular-weight polyethylene, low-molecular-weight polypropylene, microcrystalline wax, paraffin wax, Fischer-Tropsch wax, and the like; petroleum waxes such as petrolactam and the like and derivatives thereof montan wax and derivatives thereof; natural waxes such as carnauba wax, candelilla wax, and the like and derivatives thereof.

Here, the derivatives include oxides, block copolymers with vinyl monomers, and graft modified products.

Further, a diester compound comprising two ester bonds in one molecule and a polyfunctional ester compound comprising at least three ester bonds in one molecule can be used as other waxes.

Specific examples include the following compounds.

Pentaerythritol ester compounds such as pentaerythritol tetrapalminate, pentaerythritol tetrabehenate, pentaerythritol tetrastearate, and the like; glycerin ester compounds such as hexaglycerin tetrabehenate tetrapalmitate, hexaglycerin octabehenate, pentaglycerin heptabehenate, tetraglycerin hexabehenate, triglycerin pentabehenate, diglycerin tetrabehenate, glycerin tribehenate, and the like; dipentaerythritol ester compounds such as dipentaerythritol hexamyristate, dipentaerythritol hexapalmitate, and the like; and the like.

In addition, other esters such as ethylene glycol dibehenate, ethylene glycol distearate, ethylene glycol arachidinate stearate, ethylene glycol stearate palmitate, butylene glycol dibehenate, butylene glycol distearate, butylene glycol stearate palmitate, butylene glycol dibehenate, pentaerythritol tetrastearate, pentaerythritol tetrapalmitate, pentaerythritol tetrabehenate, dipentaerythritol hexapalmitate, dipentaerythritol hexastearate, dipentaerythritol hexabehenate, and the like can be used.

The melting point of the monoester compound is preferably from 60° C. to 80° C., and more preferably from 65° C. to 75° C.

By setting the above range, it becomes easy to achieve both storage stability and low-temperature fixability of the toner.

The method for producing the above monoester compound is not particularly limited, and can be exemplified by a synthetic method based on an oxidation reaction, a synthesis from a carboxylic acid and a derivative thereof, an ester group introduction reaction represented by a Michael addition reaction, a method using a dehydration condensation reaction of a carboxylic acid compound and an alcohol compound, a reaction from an acid halide and an alcohol compound, a transesterification reaction, and the like.

A catalyst may be used, as appropriate, in the production of these monoester compounds. The catalyst is preferably an acidic or alkaline catalyst generally used in esterification reactions, such as zinc acetate, titanium compounds, and the like. After the esterification reaction, the target product may be purified by recrystallization, distillation, or the like.

A specific production example of the monoester compound is shown below, but the following production example is not limiting.

First, an alcohol monomer and a carboxylic acid monomer as raw materials are added to a reaction vessel. The molar ratio of the alcohol monomer and the carboxylic acid monomer is adjusted, as appropriate, according to the chemical structure of the target monoester compound. That is, the alcohol monomer and the carboxylic acid monomer are mixed in a molar ratio of alcohol monomer:carboxylic acid monomer=1:1. In consideration of reactivity in the dehydration condensation reaction, either one of the alcohol monomer and the carboxylic acid monomer may be added to slightly exceed the above ratio.

Next, the mixture of the alcohol monomer and the carboxylic acid monomer is heated, as appropriate, to carry out the dehydration condensation reaction. A basic aqueous solution and an appropriate organic solvent are added to the esterified crude product obtained by the dehydration condensation reaction to deprotonate the unreacted alcohol monomer and carboxylic acid monomer and separate them into an aqueous phase. After that, the monoester compound can be obtained by washing, as appropriate, with water, distilling off the solvent, and filtering.

The affinity between the wax and the binder resin (A) can be determined numerically by Hansen solubility parameters (also simply referred to as "solubility parameters").

The solubility parameters are numerical values used as indexes of solubility or affinity indicating how much a certain substance dissolves in another certain substance. Substances having similar solubility parameters have high solubility and affinity, and those having different solubility parameters have low solubility and affinity.

The solubility parameters can be calculated by solubility parameter calculation software Hansen Solubility Parameters in Practice 4th Edition 4.1.03 (available from https://www.hansen-solubility.com/HSPiP/). The calculation method is based on the theory of Hansen solubility parameters. In Hansen theory of solubility parameters, the energy of molecular evaporation is divided into three types of energy, namely, the energy from dispersion forces (dispersion term, also called D term), the energy from dipole interaction (polar term, also called P term), and the energy from hydrogen bonds (hydrogen bond term, also called H term), and these are handled as a three-dimensional vector.

The solubility parameters are indexes of the affinity between the wax and the structure represented by the formula (1) or (2) in the binder resin (A), and can be indexes of the likelihood of contamination of the photosensitive member. The adhesiveness of wax can be compared by the magnitude relationship of the energy (dispersion term) from dispersion forces and the energy from dipole interaction (polar term) of the wax and the structure represented by the formula (1) or (2) in the binder resin (A).

The three-dimensional vector of solubility parameters is calculated by the following method.

(1): Using the solubility parameter calculation software, Hansen solubility parameters (D term, P term, H term), molar volume, and molecular weight are calculated for each unit derived from each monomer as a precursor of a vinyl resin or a polyester (hereinafter, also referred to as monomer unit).

For a monomer used for a vinyl resin, the calculation is performed in a state in which an unknown halogen X, which does not affect the calculation result, is added to the double bond that is cleaved by polymerization as shown in a following formula (A).

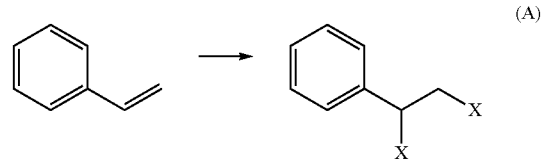

(A)

For a monomer used for a compound having at least one ester bond, the calculation is performed in a state in which one of the functional groups in the monomer that will undergo the condensation reaction is changed to [—C(=O)O—X] or [XC(=O)—O—], and another functional group is substituted with X, as shown in a following formula (B).

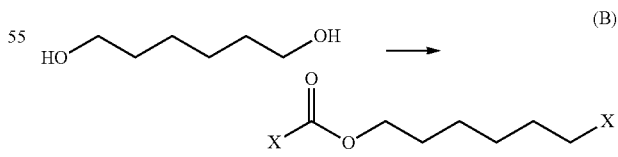

(B)

For a monomer used for a compound having at least one carbonate bond, the calculation is performed in a state in which one of the functional groups in the monomer that will undergo the condensation reaction is changed to [—O—C(=O)O—X], and another functional group is substituted with X, as shown in a following formula (C).

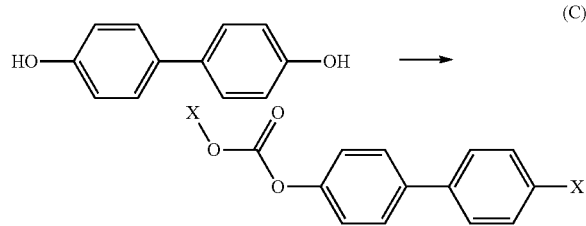 (C)

For other monomers that condense through dehydration, when the condensation is performed through a reaction such as represented by the following formula (D), the solubility parameter of each monomer is calculated in a state in which one end of the monomer is configured by the bonding groups J and X, and the other end is substituted with X as shown in the following formulas (E) and (F).

G-Ra-G+H—Rb-H→(Ra-J-Rb)$_n$     (D)

X-J-Ra-X     (E)

X-J-Rb-X     (F)

Where, G and H are reactive functional groups, J is a bonding group, and Ra and Rb are organic groups.

(2): The molar volume ratio of the unit derived from each monomer is calculated from the molar ratio of each monomer unit in the polymer and the molar volume ratio of each unit.

(3): The sum of the values obtained by multiplying the molar volume ratio by the D term of the Hansen solubility parameters of each monomer unit is taken as the D term of the Hansen solubility parameters of the polymer. The P term and H term are calculated in the same manner.

A method for deriving solubility parameters in the case of a mixture of at least two substances from a binder resin (A), a binder resin (B), and a wax, involves, first, deriving solubility parameters (D term, P term, H term) of each substance. Then, values obtained by calculating the arithmetic mean of the parameters of the D terms, the P terms, and the H terms of each substance are taken as the solubility parameters (D term, P term, H term) of the mixture.

When the dispersion term and the polar term of Hansen solubility parameters in the wax are defined as SD2 [(J/cm$^3$)$^{1/2}$] and SP2 [(J/cm$^3$)$^{1/2}$], respectively, and the dispersion term and the polar term of Hansen solubility parameters in the structure shown in the formula (2) in the binder resin (A) are defined as SD(A2) [(J/cm$^3$)$^{1/2}$] and SP(A2) [(J/cm$^3$)$^{1/2}$], respectively, from the viewpoint of obtaining an appropriate affinity, it is preferable to satisfy the following formulas (4) and (5).

$2.50 \leq SD(A2)-SD2 \leq 5.00$     (4)

$2.50 \leq SP(A2)-SP2 \leq 6.00$     (5)

Where SD(A2)–SD2 is not more than 5.00, the affinity does not become too low and the toner is unlikely to roll when contacting the medium during transfer in a high-temperature and high-humidity environment. As a result, the sharpness of the image is less likely to be lost and the image quality tends not to be deteriorated.

Where SD(A2)–SD2 is at least 2.50, the affinity does not become too high, and the wax is less likely to adhere to the photosensitive member in a high-temperature and high-humidity environment. As a result, image quality deterioration such as blank dots caused by contamination of the photosensitive member is unlikely to occur.

Where SP(A2)–SP2 is not more than 6.00, the affinity does not become too low, and the toner is unlikely to roll when contacting the medium during transfer in a high-temperature and high-humidity environment. As a result, the sharpness of the image is less likely to be lost and the image quality tends not to be deteriorated.

Where SP(A2)–SP2 is at least 2.50, the affinity does not become too high, and the wax is less likely to adhere to the photosensitive member in a high-temperature and high-humidity environment. As a result, image quality deterioration such as blank dots caused by contamination of the photosensitive member is unlikely to occur.

SD(A2)–SD2 is preferably from 3.00 to 4.00, and more preferably from 3.30 to 3.80. SP(A2)–SP2 is preferably from 2.70 to 5.00, and more preferably from 3.00 to 4.50.

Further, SD(A2) is preferably from 18.00 to 20.00, and more preferably from 19.00 to 19.50. SP(A2) is preferably from 3.00 to 6.00, and more preferably from 3.50 to 5.50.

Furthermore, SD2 is preferably from 15.00 to 18.00, and more preferably from 15.50 to 17.00. SP2 is preferably from 0.00 to 2.00, and more preferably from 0.50 to 1.50.

SD(A2) and SP(A2) can be controlled by changing the type and blending amount of the monomer having the structure represented by the formula (2'). Further, SD2 and SP2 can be controlled by changing the type of the monomer as a raw material of the monoester compound in the wax and the type and amount of the wax other than the monoester compound.

In the relationship between the photosensitive member and the toner, when the dispersion term and the polarity term of Hansen solubility parameters in the structure represented by the formula (1) in the binder resin (A) are SD(A1) [(J/cm$^3$)$^{1/2}$] and SP(A1) [(J/cm$^3$)$^{1/2}$], respectively, from the viewpoint of obtaining an appropriate affinity, it is preferable to satisfy the following formulas (6) and (7).

$2.50 \leq SD(A1)-SD2 \leq 5.00$     (6)

$2.50 \leq SP(A1)-SP2 \leq 6.00$     (7)

Where SD(A1)–SD2 is not more than 5.00, the affinity does not become too low and the toner is unlikely to roll when contacting the medium during transfer in a high-temperature and high-humidity environment. As a result, the sharpness of the image is less likely to be lost and the image quality tends not to be deteriorated.

Where SD(A1)–SD2 is at least 2.50, the affinity does not become too high, and the wax is less likely to adhere to the photosensitive member in a high-temperature and high-humidity environment. As a result, image quality deterioration such as blank dots caused by contamination of the photosensitive member is unlikely to occur.

Where SP(A1)–SP2 is not more than 6.00, the affinity does not become too low, and the toner is unlikely to roll when contacting the medium during transfer in a high-temperature and high-humidity environment. As a result, the sharpness of the image is less likely to be lost and the image quality tends not to be deteriorated.

Where SP(A1)–SP2 is at least 2.50, the affinity does not become too high, and the wax is less likely to adhere to the photosensitive member in a high-temperature and high-humidity environment. As a result, image quality deterioration such as blank dots caused by contamination of the photosensitive member is unlikely to occur.

SD(A1)−SD2 is preferably from 3.50 to 4.50, and more preferably from 3.80 to 4.40. SP(A1)−SP2 is preferably from 3.50 to 6.00, and more preferably from 4.50 to 6.00.

Also, SD(A1) is preferably from 19.00 to 21.00, and more preferably from 19.70 to 20.50. SP(A1) is preferably from 4.00 to 7.50, and more preferably from 5.00 to 7.00.

SD(A1) and SP (A1) can be controlled by changing the type and amount of the monomer having the structure represented by the formula (1').

The compatibility of the binder resin (B) and the wax can be compared by the magnitude relationship of the energy (dispersion term D) from dispersion forces and the energy from dipole interaction (polar term P) of the wax and the binder resin (B).

Since the wax and the binder resin (B) have an appropriate affinity, the low-temperature fixability and storage stability of the toner are improved. Specifically, when the dispersion term and the polar term of Hansen solubility parameters in the binder resin (B) are SD1 $[(J/cm^3)^{1/2}]$ and SP1 $[(J/cm^3)^{1/2}]$, respectively, it is preferable to satisfy the following formulas (8) and (9).

$$0.00 \leq SD1-SD2 \leq 3.00 \quad (8)$$

$$0.00 \leq SP1-SP2 \leq 0.30 \quad (9)$$

Where SD1−SD2 is not more than 3.00, the affinity between the binder resin (B) and the wax does not become too low, and the plasticizing effect produced by the wax increases, so the low-temperature fixability improves.

Where SD1−SD2 is at least 0.00, the energy of the wax is relatively low and the wax is stabilized. As a result, the wax is less likely to bleed out to the toner surface layer, and the storage stability tends to be improved.

Where SP1−SP2 is not more than 0.30, the affinity between the binder resin (B) and the wax does not become too low, and the plasticizing effect of the wax increases, so the low-temperature fixability improves.

Where SP1−SP2 is at least 0.00, the energy of the wax is relatively low and the wax is stabilized. As a result, the wax is less likely to bleed out to the toner surface layer in a high-humidity environment, and the storage stability tends to be improved. SD1−SD2 is preferably from 1.00 to 2.80, and more preferably from 2.00 to 2.50. SP1−SP2 is preferably from 0.10 to 0.25, and more preferably from 0.15 to 0.25.

Furthermore, SD1 is preferably from 17.00 to 21.00, and more preferably from 18.00 to 20.50. SP1 is preferably from 0.00 to 6.00, and more preferably from 0.00 to 4.00.

SD1 and SP1 can be controlled by changing the type and blending ratio of the monomers constituting the binder resin (B).

The toner particle has a core-shell structure having a core comprising the binder resin (B) and wax, and a shell layer formed on the surface of the core. Since the toner particle has the core-shell structure, it is possible to prevent the wax from adhering to the photosensitive member, and it is possible to maintain high image quality for a long time. A toner having no core-shell structure may cause contamination of the photosensitive member with wax, resulting in deterioration of image quality.

Further, the thickness of the shell layer is preferably not more than 100 nm. More preferably, it is not more than 50 nm. The thickness of the shell is preferably at least 1 nm.

The thickness of the shell layer can be analyzed by various analysis methods, and one example is shown below.

Measurement by time-of-flight secondary ion mass spectrometry: the depth at which the ratio of the signal from the shell layer and the signal from the core is 1:1 when the depth profile measurement is performed is taken as the thickness of the shell layer. The thickness of the shell layer can be controlled by the addition amount of raw materials used for the shell layer added at the time of producing the toner particle.

Electrophotographic Photosensitive Member

A method for producing a photosensitive member can be exemplified by preparing a coating liquid for each layer described below, coating the coating liquids on the support in the desired order of layers, and drying the coating liquids. At this time, examples of the method for coating the coating liquids include dip coating, spray coating, inkjet coating, roll coating, die coating, blade coating, curtain coating, wire bar coating, ring coating, and the like. Among these, dip coating is preferable from the viewpoint of efficiency and productivity.

Each layer is described hereinbelow.

Support

The photosensitive member may have a support. The support is preferably a conductive support having electrical conductivity. Further, examples of the shape of the support include a cylindrical shape, a belt shape, and a sheet shape. Of these, a cylindrical support is preferable. Further, the surface of the support may be subjected to electrochemical treatment such as anodic oxidation, or blast treatment, cutting treatment, and the like.

Materials such as a metal, a resin, glass, and the like are preferable for the support.

Examples of the metal include aluminum, iron, nickel, copper, gold, stainless steel, alloys thereof, and the like. Among these, an aluminum support using aluminum is preferable.

Further, the resin or glass may be made conductive by a treatment such as mixing or coating with a conductive material.

Conductive Layer

A conductive layer may be provided on the support. By providing the conductive layer, it is possible to hide scratches and irregularities on the surface of the support and control reflection of light on the surface of the support.

The conductive layer preferably comprises conductive particles and a resin.

Examples of the material of the conductive particles include a metal oxide, a metal, carbon black and the like.

Examples of the metal oxide include zinc oxide, aluminum oxide, indium oxide, silicon oxide, zirconium oxide, tin oxide, titanium oxide, magnesium oxide, antimony oxide, bismuth oxide, and the like.

Examples of the metal include aluminum, nickel, iron, nichrome, copper, zinc, silver, and the like.

Among these, it is preferable to use a metal oxide as the material of the conductive particles, and it is particularly preferable to use titanium oxide, tin oxide, or zinc oxide.

When a metal oxide is used as the material of the conductive particles, the surface of the metal oxide particles may be treated with a silane coupling agent or the like, or the metal oxide may be doped with an element such as phosphorus or aluminum or an oxide thereof.

Further, the conductive particle may have a layered configuration comprising a core particle and a coating layer that coats the particle. Examples of the material of the core particle include titanium oxide, barium sulfate, zinc oxide, and the like. Examples of the material of the coating layer include metal oxides such as tin oxide.

When metal oxide particles are used as the conductive particles, the volume average particle diameter thereof is preferably from 1 nm to 500 nm, and more preferably from 3 nm to 400 nm.

Examples of the resin include polyester resins, polycarbonate resins, polyvinyl acetal resins, acrylic resins, silicone resins, epoxy resins, melamine resins, polyurethane resins, phenol resins, alkyd resins, and the like.

Further, the conductive layer may further include silicone oil, resin particles, a masking agent such as titanium oxide, and the like.

The average film thickness of the conductive layer is preferably from 1 μm to 50 μm, and particularly preferably from 3 μm to 40 μm.

The conductive layer can be formed by preparing a conductive layer coating solution comprising each of the above-mentioned materials and a solvent, forming the coating film, and drying. Examples of the solvent suitable for the coating liquid include alcohol solvents, sulfoxide solvents, ketone solvents, ether solvents, ester solvents, aromatic hydrocarbon solvents, and the like. Examples of the dispersion method for dispersing the conductive particles in the conductive layer coating solution include methods using a paint shaker, a sand mill, a ball mill, and a liquid collision type high speed disperser.

Undercoat Layer

An undercoat layer may be provided on the support or the conductive layer. By providing the undercoat layer, the adhesion function between the layers can be enhanced and a charge injection blocking function can be imparted.

The undercoat layer preferably comprises a resin. The undercoat layer may be formed as a cured film by polymerizing a composition comprising a monomer having a polymerizable functional group.

Examples of the resin include polyester resins, polycarbonate resins, polyvinyl acetal resins, acrylic resins, epoxy resins, melamine resins, polyurethane resins, phenol resins, polyvinylphenol resins, alkyd resins, polyvinyl alcohol resins, polyethylene oxide resins, polypropylene oxide resins, polyamide resins, polyamic acid resins, polyimide resins, polyamide-imide resins, cellulose resins, and the like.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, a carbon-carbon double bond group, and the like.

Further, the undercoat layer may further comprise an electron transport substance, a metal oxide, a metal, a conductive polymer, and the like for the purpose of enhancing the electrical characteristics. Among these, it is preferable to comprise an electron transport substance and a metal oxide.

Examples of the electron transport substance include quinone compounds, imide compounds, benzimidazole compounds, cyclopentadienylidene compounds, fluorenone compounds, xanthone compounds, benzophenone compounds, cyanovinyl compounds, aryl halide compounds, silole compounds, boron-containing compounds, and the like. An undercoat layer may be formed as a cured film by using an electron transport substance having a polymerizable functional group as the electron transport substance and copolymerizing the electron transport substance with the above-mentioned monomer having a polymerizable functional group.

Examples of the metal oxide include indium tin oxide, tin oxide, indium oxide, titanium oxide, zinc oxide, aluminum oxide, silicon dioxide, and the like.

Examples of the metals include gold, silver, aluminum, and the like.

Also, the undercoat layer may further comprise an additive.

The average film thickness of the undercoat layer is preferably from 0.1 μm to 50 μm, more preferably from 0.2 μm to 40 μm, and particularly preferably from 0.3 μm to 30 μm.

The undercoat layer can be formed by preparing an undercoat layer coating solution comprising the above-mentioned materials and a solvent, forming the coating film, and drying and/or curing. Examples of the solvent used for the coating liquid include an alcohol solvent, a ketone solvent, an ether solvent, an ester solvent, an aromatic hydrocarbon solvent, and the like.

Photosensitive Layer

The photosensitive member can generally have a photosensitive layer. The photosensitive layer is preferably formed on a support, and the conductive layer and the undercoat layer may be provided between the support and the photosensitive layer. The photosensitive layers are mainly classified into (1) single-layer type photosensitive layers and (2) laminated type photosensitive layers.

(1) The single-layer type photosensitive layer can have, for example, a photosensitive layer comprising a combination of a charge generation substance, a charge transport substance and an electron transport substance.

(2) The laminated photosensitive layer can have, for example, a charge generation layer comprising a charge generation substance and a charge transport layer comprising a charge transport substance.

(1) Single-Layer Type Photosensitive Layer

The photosensitive layer according to the present disclosure can be a single-layer type photosensitive layer. The single-layer type photosensitive layer can be formed, for example, by preparing a coating solution for a photosensitive layer comprising a charge generation substance, a charge transport substance, an electron transport substance, a resin comprising a binder resin (A), and a solvent, forming the coating film, and drying.

The single-layer type photosensitive layer may comprise a resin other than the binder resin (A) as long as the effect of the present disclosure is not impaired. Examples of the resin other than the binder resin (A) include a polycarbonate resin, a styrene resin, an acrylic resin, and the like.

Examples of the charge generation substance include azo pigments, perylene pigments, polycyclic quinone pigments, indigo pigments, phthalocyanine pigments, and the like. Among these, azo pigments and phthalocyanine pigments are preferable. Among the phthalocyanine pigments, a metal-free phthalocyanine, an oxytitanium phthalocyanine pigment, a chlorogallium phthalocyanine pigment, and a hydroxygallium phthalocyanine pigment are preferable.

Examples of the charge transport substance include polycyclic aromatic compounds, heterocyclic compounds, hydrazone compounds, styryl compounds, enamine compounds, benzidine compounds, triarylamine compounds, and resins having groups derived from these substances. These charge transport substances may be used alone or in combination of at least two. Among these, triarylamine compounds and benzidine compounds are preferable.

Examples of the electron transport substance include quinone compounds, diimide compounds, hydrazone compounds, malononitrile compounds, thiopyran compounds, trinitrothioxanthone compounds, 3,4,5,7-tetranitro-9-fluorenone compounds, dinitroanthracene compounds, dinitroacridine compounds, tetracyanoethylene, 2,4,8-trinitrothioxanthone, dinitrobenzene, dinitroacridine, succinic anhydride, maleic anhydride, and dibromomaleic anhydride.

Examples of the quinone compounds include diphenoquinone compounds, azoquinone compounds, anthraquinone compounds, naphthoquinone compounds, nitroanthraquinone compounds, and dinitroanthraquinone compounds.

These electron transport substances may be used alone or in combination of at least two.

Among these electron transport substances, the compounds represented by following formulas (10) to (18) are preferable.

(10)
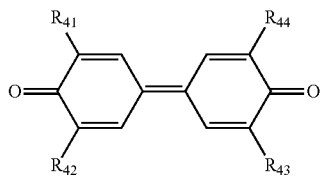

(11)
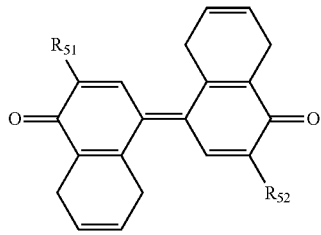

(12)
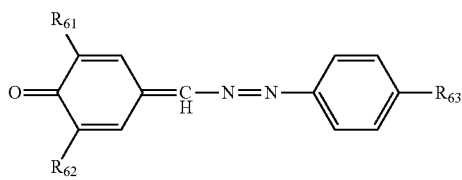

(13)
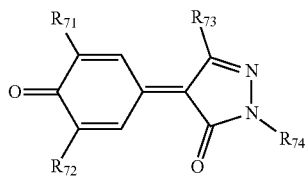

(14)
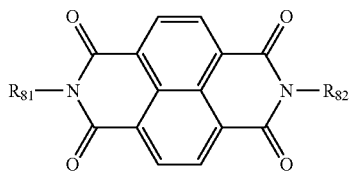

(15)
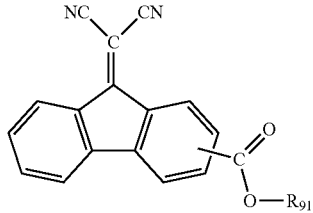

(16)
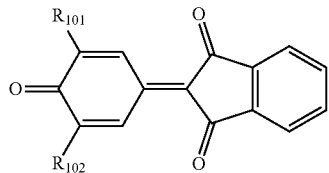

(17)
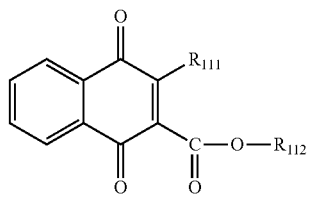

(18)
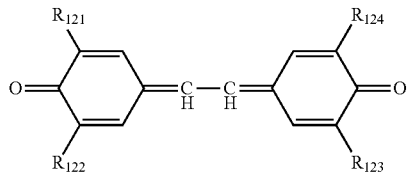

Where, $R_{41}$ to $R_{44}$, $R_{51}$, $R_{52}$, $R_{61}$, $R_{62}$, $R_{71}$ to $R_{73}$, $R_{101}$, $R_{102}$, and $R_{121}$ to $R_{124}$ each independently represent a hydrogen atom or an alkyl group having from 1 to 6 (preferably from 1 to 4) carbon atoms.

$R_{63}$ represents a hydrogen atom, a halogen group or an alkyl group having from 1 to 6 (preferably from 1 to 4) carbon atoms, $R_{74}$, $R_{81}$ and $R_{82}$ each independently represent an alkyl group having from 1 to 6 (preferably from 1 to 4) carbon atoms, a halogen group, or a phenyl group having an alkyl group having from 1 to 6 (preferably from 1 to 4) carbon atoms, $R_{91}$ represents an alkyl group having from 1 to 6 (preferably from 1 to 4) carbon atoms which may have a hydrogen atom or a halogen atom, and $R_{111}$ and $R_{112}$ represent an alkyl group having from 1 to 6 (preferably from 1 to 4) carbon atoms which may have a substituent, or a phenyl group which may have a substituent.

The content ratio (mass ratio) of the charge generation substance to all the resin components in the photosensitive layer is preferably from 1:1000 to 50:100, and more preferably from 5:1000 to 30:100.

The content ratio (mass ratio) of the charge transport substance to all the resin components in the photosensitive layer is preferably from 1:10 to 20:10, and more preferably from 1:10 to 10:10.

The content ratio (mass ratio) of the electron transport substance to all the resin components in the photosensitive layer is preferably from 5:100 to 10:10, and more preferably from 1:10 to 8:10.

Further, the photosensitive layer may comprise additives such as an antioxidant, an ultraviolet absorber, a plasticizer, a leveling agent, a slipperiness imparting agent, an abrasion resistance improver, and the like. Specific examples include hindered phenol compounds, hindered amine compounds, sulfur compounds, phosphorus compounds, benzophenone compounds, siloxane-modified resins, silicone oil, fluorine resin particles, polystyrene resin particles, polyethylene resin particles, silica particles, alumina particles, boron nitride particles, and the like.

Among them, silica particles may be comprised in order to improve the durability of the photosensitive layer.

The silica particles may be surface-treated with a surface treatment agent. Examples of the surface treatment agent include hexamethyldisilazane, N-methyl-hexamethyldisilazane, hexamethyl-N-propyldisilazane, dimethyldichlorosilane, and polydimethylsiloxane. Hexamethyldisilazane is particularly preferable as the surface treatment agent.

The amount of the silica particles is preferably from 0.5 parts by mass to 15 parts by mass with respect to 100 parts by mass of the binder resin (A).

The amount of the silica particles is preferably from 0.5 parts by mass to 15 parts by mass, and more preferably from 1 part by mass to 10 parts by mass with respect to 100 parts by mass of all the resin components in the photosensitive layer.

The volume average particle diameter of the silica particles is preferably from 7 nm to 1000 nm, and more preferably from 10 nm to 300 nm. The identification of the silica particles and the volume average particle diameter of the silica particles can be confirmed by observing the cross section of the photosensitive layer using a scanning electron microscope (SEM) or the like.

The film thickness of the photosensitive layer is preferably from 5 μm to 100 μm, and more preferably from 10 μm to 50 μm.

The photosensitive layer can be formed by preparing a photosensitive layer coating solution comprising the above-mentioned materials and a solvent, forming the coating film, and drying. Examples of the solvent used for the coating liquid include alcohol solvents, ketone solvents, ether solvents, ester solvents and aromatic hydrocarbon solvents. Among these solvents, ether solvents and aromatic hydrocarbon solvents are preferable.

(2) Laminated Photosensitive Layer

The photosensitive layer may be a laminated photosensitive layer. The laminated photosensitive layer can have, for example, a charge generation layer and a charge transport layer.

The charge generation layer may comprise a charge generation substance and a resin.

The charge transport layer may comprise a charge transport substance and a resin comprising the binder resin (A).

As the charge generation substance, the charge transport substance, and the resin, the same materials as those exemplified in the above-mentioned "(1) Single layer type photosensitive layer" can be used.

The amount of the charge generation substance in the charge generation layer is preferably from 40% by mass to 85% by mass, and more preferably from 60% by mass to 80% by mass with respect to the total mass of the charge generation layer.

The average film thickness of the charge generation layer is preferably from 0.1 μm to 1 μm, and more preferably from 0.15 μm to 0.4 μm.

The amount of the charge transport substance in the charge transport layer is preferably from 25% by mass to 70% by mass, and more preferably from 30% by mass to 55% by mass with respect to the total mass of the charge transport layer.

The content ratio (mass ratio) of the charge transport substance and the resin is preferably from 4:10 to 20:10, and more preferably from 5:10 to 12:10.

Also, the same additives as those exemplified in the above "(1) Single layer type photosensitive layer" may be included.

The average film thickness of the charge transport layer is preferably from 5 μm to 50 μm, more preferably from 8 μm to 40 μm, and particularly preferably from 10 μm to 30 μm.

Process Cartridge, Image Forming Apparatus

A process cartridge has an electrophotographic photosensitive member, and a developing device that has a toner and supplies the toner onto the electrophotographic photosensitive member, the electrophotographic photosensitive member having a surface layer comprising the binder resin (A), and the toner being the above toner.

The process cartridge can be detachably attached to the main body of an image forming apparatus.

The process cartridge may have, if necessary, at least one selected from the group consisting of a charging device, an image forming device, a transfer device, and a cleaning device.

Further, the image forming apparatus has an electrophotographic photosensitive member, and a developing device that has a toner and supplies the toner onto the electrophotographic photosensitive member, the electrophotographic photosensitive member having a surface layer comprising the binder resin (A), and the toner being the above toner.

The image forming apparatus may have, if necessary, at least one selected from the group consisting of a charging device, an image forming device, a transfer device, a cleaning device, and a developing device.

The FIGURE shows an example of a schematic configuration of an image forming apparatus having a process cartridge equipped with an electrophotographic photosensitive member.

The reference numeral 1 denotes a cylindrical electrophotographic photosensitive member which is rotationally driven around a shaft 2 in a direction of an arrow at a predetermined peripheral speed. The surface of the electrophotographic photosensitive member 1 is charged to a predetermined positive or negative potential by a charging means 3. The FIGURE illustrates a roller charging method using a roller type charging member, but a charging method such as a corona charging method, a proximity charging method, an injection charging method, or the like may also be adopted.

The surface of the charged electrophotographic photosensitive member 1 is irradiated with exposure light 4 from an exposure means (not shown), and an electrostatic latent image corresponding to the target image information is formed. The electrostatic latent image formed on the surface of the electrophotographic photosensitive member 1 is developed with a toner accommodated in a developing means 5, and a toner image is formed on the surface of the electrophotographic photosensitive member 1. The toner image formed on the surface of the electrophotographic photosensitive member 1 is transferred to a transfer material 7 by a transfer means 6. The transfer material 7 onto which the toner image has been transferred is conveyed to a fixing means 8, undergoes fixing processing of the toner image, and is printed out to the outside of the electrophotographic apparatus.

The image forming apparatus may have a cleaning means 9 for removing adhered substances such as toner remaining on the surface of the electrophotographic photosensitive member 1 after the transfer. Alternatively, a so-called cleanerless system may be used in which the adhered matter is removed by a developing means or the like without separately providing a cleaning means. The image forming apparatus may have a charge eliminating mechanism for eliminating the charge on the surface of the electrophotographic photosensitive member 1 with pre-exposure light 10 from a pre-exposure means (not shown). Further, a guide means 12 such as a rail may be provided in order to attach/detach the process cartridge 11 to/from the image forming apparatus main body.

The electrophotographic photosensitive member can be used in a laser beam printer, an LED printer, a copier, a facsimile apparatus, composite machines thereof, and the like.

In a cross section of the toner particle observed using a transmission electron microscope, the wax is observed as domains, and where a sum total of areas occupied by the domains in the entire cross section is defined as Wp, a sum total of areas occupied by the domains in a region bounded by a contour of the cross section and a line that partitions a region 0.1 μm inward of the contour of the cross section is defined as Ws, and a sum total of areas occupied by the domains in an internal region inward of the line that partitions a region within 0.1 μm inward of the contour of the cross section is defined as Wc, a ratio (Ws/Wp) of Ws to Wp is preferably 0.0 to 10.0%.

By controlling the Ws/Wp within this range, the amount of wax present near the toner surface is reduced and the amount of wax present on the toner particle surface in a high-temperature and high-humidity environment is reduced, so that good satisfactory image quality is obtained. When Ws/Wp is not more than 10.0%, an increase in the amount of wax present near the toner surface layer due to out-migration of wax in the toner, or the like, in a high-temperature and high-humidity environment is unlikely to occur. As a result, contamination of the electrophotographic photosensitive member and rolling during transfer are less likely to occur, and image quality is less likely to deteriorate. Ws/Wp is more preferably 0.1 to 7.0%.

Ws/Wp can be controlled by the amount of wax in the toner and the thickness of the shell layer.

Further, the ratio (Ws/Wc) of Ws to Wc is 0.00 to 0.50%. By controlling the ratio within this range, the amount of wax present in the vicinity of the toner particle surface layer becomes relatively smaller than that in the vicinity of the center, and durability and storage stability under high-temperature and high-humidity environment can be improved while maintaining low-temperature fixability.

When Ws/Wc is not more than 0.50%, the amount of wax in the vicinity of the toner particle surface is relatively small, the plasticizing effect of the toner is improved, and the durability and storage stability under high-temperature and high-humidity environment are improved.

Ws/Wc is preferably 0.01 to 0.30%. By separating Wc and Ws at a distance of 0.1 μm from the contour of the cross section of the toner particle, it becomes possible to compare the amount of wax in the vicinity of the shell layer and the amount of wax in the core, and by setting Ws/Wc within the above range, it is possible to show that the amount of wax in the shell layer is relatively small.

Ws/Wc can be controlled by the amount of wax added to the toner, the thickness of the shell layer, and the like.

The shell layer of the toner particle preferably comprises a vinyl resin comprising a monomer unit derived from methyl methacrylate. By comprising the monomer unit derived from methyl methacrylate, the surface of the toner particles can be made positively charged, thereby facilitating the use in an image forming apparatus using a positively charged toner.

Also, in secondary ion depth profile measurement of the surface of the toner by time-of-flight secondary ion mass spectrometry (TOF-SIMS), when secondary ion intensities derived from the wax and the vinyl resin at a depth of t [nm] from the surface of the toner are defined as Iw(t) and Ib(t), respectively, following formulas (19) and (20) are satisfied in a range of 0≤t≤10.

$$Iw(t) < Ib(t) \qquad (19)$$

$$Iw(t) < 0.005 \qquad (20)$$

By satisfying the above formulas (19) and (20), it is possible to suppress the amount of wax in the toner surface layer, and it is possible to maintain good durability and storage stability in a high-temperature and high-humidity environment. When Iw(t)<Ib(t), the amount of wax present in the toner surface layer can be reduced. As a result, contamination of the photosensitive member and rolling during transfer are less likely to occur, and the image quality is less likely to deteriorate. Also in the case of Iw(t)<0.005, the amount of wax present in the toner surface layer can be reduced, and as a result, contamination of the photosensitive member or rolling during transfer is less likely to occur, and image quality is less likely to deteriorate. Iw(t) is more preferably Iw(t)<0.003. Iw(t) can be set to, for example, Iw(t)≥0.000.

The formulas (19) and (20) can be controlled, for example, by changing the type and amount of the wax to be added, the thickness of the shell layer, and the like.

Hereinafter, the toner used in the present disclosure will be further described.

The toner is not particularly limited as long as it comprises a toner particle having a core-shell structure and the toner particle comprises a monoester compound represented by the formula (3), and there is no particular limitation on the method for producing the toner.

It is also possible to produce the toner particles by a pulverizing method, and also by a method for producing the toner particles in an aqueous medium such as a dispersion polymerization method, an association aggregation method, a dissolution suspension method, an emulsion aggregation method.

However, from the viewpoint of controlling the presence state of the monoester compound and the viewpoint of constructing a core-shell structure, a method for producing toner particles in an aqueous medium is preferable, and from the viewpoint of toner shape control, it is more preferable to produce the toner particles by a suspension polymerization method.

The suspension polymerization method is described below.

In the suspension polymerization method, a polymerizable monomer composition is obtained by uniformly dissolving or dispersing a polymerizable monomer and a wax (and optionally a colorant, a polymerization initiator, a cross-linking agent, a charge control agent, and other additives). Then, the polymerizable monomer composition is dispersed in a continuous layer (for example, an aqueous phase) comprising a dispersing agent by using a suitable stirrer to cause a polymerization reaction at the same time, thereby obtaining toner particles having a desired particle diameter. The toner particles obtained by this suspension polymerization method (hereinafter, also referred to as "polymerized toner particles") have a substantially spherical shape of each individual toner particle, so that the distribution of the charge amount is relatively uniform. Therefore, image quality can be expected to improve.

Examples of the polymerizable monomer that constitutes the polymerizable monomer composition in the production of polymerized toner particles are presented hereinbelow.

It is preferable to use a monovinyl monomer as the polymerizable monomer. Examples of monovinyl monomers include styrene; styrene derivatives such as vinyl toluene, α-methylstyrene, and the like; acrylic acid and methacrylic acid; acrylic acid esters such as methyl acrylate, ethyl acrylate, propyl acrylate, butyl acrylate, 2-ethylhexyl acrylate, dimethylaminoethyl acrylate, and the like; methacrylic acid esters such as methyl methacrylate, ethyl methacrylate, propyl methacrylate, butyl methacrylate, 2-ethylhexyl methacrylate, dimethylaminoethyl methacrylate, and the like; nitrile compounds such as acrylonitrile, methacrylonitrile, and the like; amide compounds such as acrylamide, methacrylamide, and the like; olefins such as ethylene, propylene, butylene, and the like.

Among these, the monovinyl monomer preferably comprises at least one selected from the group consisting of styrene, styrene derivatives, acrylic acid esters and methacrylic acid esters. More preferably, at least one selected from the group consisting of styrene and styrene derivatives and at least one selected from the group consisting of acrylic acid esters and methacrylic acid esters are included as monovinyl monomers.

These monovinyl monomers may be used alone or in combination of at least two.

The polymerizable monomer preferably comprises the monovinyl monomer as a main component. Specifically, the amount of the monovinyl monomer in the polymerizable monomer is preferably from 50% by mass to 100% by mass.

Examples of polymerization initiators used in the production of toner particles by a polymerization method include persulfates such as potassium persulfate, ammonium persulfate, and the like; azo compounds such as 4,4'-azobis(4-cyanovaleric acid), 2,2'-azobis (2-methyl-N-(2-hydroxyethyl)propionamide), 2,2'-azobis(2-amidinopropane) dihydrochloride, 2,2'-azobis(2,4-dimethylvaleronitrile), 2,2'-azobisisobutyronitrile, and the like; organic peroxides such as di-t-butyl peroxide, benzoyl peroxide, t-butylperoxy-2-ethylhexanoate, t-butylperoxydiethyl acetate, t-hexylperoxy-2-ethylbutanoate, diisopropyl peroxydicarbonate, di-t-butyl peroxyisophthalate, t-butyl peroxyisobutyrate, and the like. These can be used alone or in combination of at least two. Among these, it is preferable to use the organic peroxides because the amount of the residual polymerizable monomer can be reduced and the printing durability is excellent.

Among the organic peroxides, peroxyesters are preferable because of good initiator efficiency and also because the amount of the remaining polymerizable monomer can be reduced, and non-aromatic peroxyesters, that is, peroxyesters having no aromatic ring, are more preferable.

As described above, the polymerization initiator may be added after the polymerizable monomer composition is dispersed in the aqueous medium and before the formation of droplets, but the polymerization initiator may be also added to the monomer composition before dispersion in the aqueous medium.

The addition amount of the polymerization initiator used for the polymerization of the polymerizable monomer composition is preferably from 0.1 parts by mass to 20 parts by mass, more preferably from 0.3 parts by mass to 15 parts by mass, and particularly preferably from 1 part by mass to 10 parts by mass with respect to 100 parts by mass of the polymerizable monomer.

A crosslinking agent may be added when the toner particles are produced by the polymerization method. The preferable addition amount of the crosslinking agent is from 0.001 part by mass to 15 parts by mass with respect to 100 parts by mass of the polymerizable monomer.

A compound having at least two polymerizable double bonds is mainly used as the crosslinking agent. Specific examples include aromatic divinyl compounds such as divinylbenzene, divinylnaphthalene, derivatives thereof and the like; ester compounds in which at least two carboxylic acids having carbon-carbon double bonds are ester-bonded to an alcohol having at least two hydroxyl groups such as ethylene glycol dimethacrylate, diethylene glycol dimethacrylate, and the like; other divinyl compounds such as N,N-divinylaniline, divinyl ether, and the like; compounds having at least three vinyl groups; and the like.

These cross-linking agents may be used alone or in combination of at least two.

Further, the toner particle may comprise a colorant. When producing a color toner, black, cyan, yellow, and magenta colorants can be used.

As the black colorant, for example, carbon black and titanium black, and magnetic powder such as zinc iron oxide, nickel iron oxide, and the like can be used.

As the cyan colorant, for example, a copper phthalocyanine compound, derivatives thereof, an anthraquinone compound, and the like can be used.

Specific examples include C.I. Pigment Blue 2, 3, 6, 15, 15:1, 15:2, 15:3, 15:4, 16, 17:1, 60, and the like.

As the yellow colorant, for example, compounds such as azo pigments such as monoazo pigments, disazo pigments, and the like and condensed polycyclic pigments can be used. Specific examples include C.I. Pigment Yellow 3, 12, 13, 14, 15, 17, 62, 65, 73, 74, 83, 93, 97, 120, 138, 155, 180, 181, 185, 186, 213, and the like.

As the magenta colorant, for example, compounds such as azo pigments such as monoazo pigments, disazo pigments, and condensed polycyclic pigments can be used. Specific examples include C.I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, 237, 238, 251, 254, 255, 269 and C.I. Pigment Violet 19, and the like.

Each colorant may be used alone or in combination of at least two. The amount of the colorant is preferably from 1 part by mass to 10 parts by mass with respect to 100 parts by mass of the polymerizable monomer.

As other additives, a positively or negatively chargeable charge control agent can be used to improve the charging performance of the toner.

The charge control agent is not particularly limited as long as it is generally used as a charge control agent for toner. Among the charge control agents, positively chargeable or negatively chargeable charge control resins are preferred because of high compatibility with the polymerizable monomers and because stable charging performance (charge stability) can be imparted to the toner particles. Further, from the viewpoint of obtaining a positively chargeable toner, a positively chargeable charge control resin is more preferably used.

Examples of the positively chargeable charge control agent include nigrosine dyes, quaternary ammonium salts, triaminotriphenylmethane compounds, imidazole compounds, also polyamine resins which are preferably used as a charge control resin, and also quaternary ammonium group-containing copolymers, quaternary ammonium salt group-containing copolymers, and the like. Examples of commercially available charge control resins include FCA-592P manufactured by Fujikura Kasei Co., Ltd.

Examples of the negatively chargeable charge control agent include azo dyes comprising a metal such as Cr, Co, Al, Fe, and the like, salicylic acid metal compounds, and alkylsalicylic acid metal compounds, and also sulfonic acid group-containing copolymers sulfonate group-containing copolymers, carboxylic acid group-containing copolymers, carboxylate group-containing copolymers, and the like as charge control resins to be preferably used.

The charge control agent is preferably used in an amount of from 0.01 parts by mass to 10 parts by mass, more preferably from 0.03 parts by mass to 8 parts by mass with respect to 100 parts by mass of the polymerizable monomer. Where the addition amount of the charge control agent is at least 0.01 part by mass, fogging is less likely to occur. Meanwhile, when the addition amount of the charge control agent is not more than 10 parts by mass, print stains are less likely to occur.

Also, as other additives, it is preferable to use a molecular weight adjusting agent when polymerizing a polymerizable monomer which is polymerized to form a binder resin.

The molecular weight adjusting agent is not particularly limited as long as it is generally used as a molecular weight adjusting agent for toners. Examples thereof include mercaptans such as t-dodecyl mercaptan, n-dodecyl mercaptan, n-octyl mercaptan, 2,2,4,6,6-pentamethylheptane-4-thiol, and the like; thiuram disulfides such as tetramethylthiuram disulfide, tetraethylthiuram disulfide, tetrabutylthiuram disulfide, N,N'-dimethyl-N,N'-diphenylthiuram disulfide, N,N'-dioctadecyl-N,N'-diisopropylthiuram disulfide, and the like; and the like. These molecular weight modifiers may be used alone or in combination of at least two.

The molecular weight adjusting agents is preferably used in an amount of from 0.01 parts by mass to 10 parts by mass, and more preferably from 0.1 parts by mass to 5 parts by mass with respect to 100 parts by mass of the polymerizable monomer.

In the method for producing toner particles by a polymerization method, generally, the above-mentioned toner particle raw materials are added, as appropriate, and uniformly dissolved or dispersed by a disperser such as homogenizer, a ball mill, an ultrasonic disperser, or the like to obtain a polymerizable monomer composition which is suspended in an aqueous medium comprising a dispersing agent. At this time, where the desired size of the toner particles is obtained using a high-speed disperser such as a high-speed stirrer or an ultrasonic disperser, the particle diameter of the obtained toner particles becomes sharper.

Regarding the timing of adding the polymerization initiator, it may be added at the same time as other additives are added to the polymerizable monomer, or may be mixed immediately before the polymerizable monomer composition is suspended in the aqueous medium. Also, a polymerization initiator dissolved in a polymerizable monomer or a solvent may be added immediately after granulation and before starting the polymerization reaction.

After granulation, a usual stirrer may be used to perform stirring to maintain the particle state and prevent particles from floating or settling.

When manufacturing toner particles, known surfactants, organic dispersing agents and inorganic dispersing agents can be used as dispersing agents. Among them, the inorganic dispersing agent are preferably used because the steric hindrance thereof ensures dispersion stability, so the stability thereof is unlikely to deteriorate even when the reaction temperature is changed, and washing is facilitated and is unlikely to adversely affect the toner. Examples of such inorganic dispersing agents include sulfates such as barium sulfate, calcium sulfate, and the like; carbonates such as barium carbonate, calcium carbonate, magnesium carbonate, and the like; phosphates such as calcium phosphate and the like; metal oxides such as aluminum oxide, titanium oxide, and the like; metal hydroxides such as aluminum hydroxide, magnesium hydroxide, sodium hydroxide, ferric hydroxide, and the like; and the like.

It is desirable to use these inorganic dispersing agents in an amount from 0.2 parts by mass to 20 parts by mass with respect to 100 parts by mass of the polymerizable monomer. The above dispersing agents may be used alone or in combination of two or more. Furthermore, from 0.001 part by mass to 0.1 part by mass of a surfactant may be used in combination therewith.

In the step of polymerizing the above polymerizable monomer, the polymerization temperature is preferably at least 50° C., and more preferably from 60° C. to 95° C. The reaction time of the polymerization is preferably from 1 hour to 20 hours, and more preferably from 2 hours to 15 hours.

The toner particle is a polymer particle of the so-called core-shell type (or also referred to as "capsule type") that is obtained by using a polymer particle as a core layer and forming a shell layer different from the core layer on the outside thereof. With the core-shell type polymer particle, a decrease in fixing temperature can be balanced with prevention of aggregation during storage by coating the core layer made of a substance having a low softening point with a substance having a higher softening point.

There is no particular limitation on a method for producing the core-shell type polymer particles using the above-mentioned polymer particles, and conventionally known methods can be used. Among them, the in situ polymerization method and phase separation method are preferable from the viewpoint of production efficiency.

The method for producing core-shell type polymer particles by the in situ polymerization method will be described below.

Core-shell type polymer particles can be obtained by adding a polymerizable monomer for forming a shell layer (polymerizable monomer for the shell) and a polymerization initiator to a water-based medium in which polymer particles are dispersed and performing polymerization.

The same polymerizable monomers as described above can be used as the polymerizable monomer for the shell. Among them, monomers such as styrene, acrylonitrile, methyl methacrylate, and the like, which make it possible to obtain a polymer having a glass transition temperature (Tg) of more than 80° C., are preferably used alone or in combination of at least two. Among them, at least methyl methacrylate is preferably used as the polymerizable monomer for the shell.

Examples of the polymerization initiator to be used for the polymerization of the polymerizable monomer for the shell include water-soluble polymerization initiators such as metal persulfates such as potassium persulfate, ammonium persulfate, and the like; azo-based initiators such as 2,2'-azobis(2-methyl-N-(2-hydroxyethyl)propionamide), 2,2'-azobis-(2-methyl-N-(1,1-bis(hydroxymethyl)2-hydroxyethyl)propionamide), 2,2'-azobis[N-(2-carboxyethyl)-2-methylpropionamidine], hydrates thereof, and the like; and the like. These can be used alone or in combination of at least two. The amount of the polymerization initiator is preferably from 0.1 parts by mass to 30 parts by mass, and more preferably from 1 part by mass to 20 parts by mass with respect to 100 parts by mass of the polymerizable monomer for the shell.

When using the phase separation method, it is preferable to add a polymer obtained by polymerizing in advance a substance forming the shell to a polymerizable monomer for forming the core. When a polymer polymerized in advance is used, a reactive polymer having an unsaturated bond is more preferred.

The polymerization temperature of the shell layer is preferably at least 50° C., and more preferably from 60° C. to 95° C. The reaction time of the polymerization is preferably from 1 hour to 20 hours, and more preferably from 2 hours to 15 hours.

If necessary, toner particles can also be obtained by filtering, washing and drying the obtained polymer particles by known methods. Further, if necessary, a classification step may be added to cut coarse powder or fine powder contained in the toner particles.

The obtained toner particles can be used as they are as a toner. Also, if necessary, a toner can be obtained by mixing an external additive with the toner particles to adhere the external additive to the surface of the toner particles.

A stirrer for performing the mixing treatment is not particularly limited as long as the external additive can be adhered to the surface of the toner particles. For example, the external addition treatment can be performed using a stirrer capable of mixing and stirring such as FM mixer (trade name, manufactured by Nippon Coke Industry Co., Ltd.), SUPER mixer (trade name, manufactured by Kawada Manufacturing Co., Ltd.), Q mixer (trade name, manufactured by Nippon Coke Industry Co., Ltd.), MECHANOFUSION system (trade name, manufactured by Hosokawa Micron Co., Ltd.), MECHANOMILL (trade name, manufactured by Okada Seiko Co., Ltd.), and the like.

Examples of the external additive include inorganic fine particles such as silica, titanium oxide, aluminum oxide, zinc oxide, tin oxide, calcium carbonate, calcium phosphate, cerium oxide, and the like; organic fine particles such as polymethyl methacrylate resin, silicone resin, melamine resin, and the like; and the like. Among these, inorganic fine particles are preferable, and among the inorganic fine particles, silica and titanium oxide are preferable, and silica is more preferable.

These external additives may be used alone or in combination of at least two.

The amount of the external additive is preferably from 0.05 parts by mass to 6 parts by mass, and more preferably from 0.2 parts by mass to 5 parts by mass with respect to 100 parts by mass of the toner particles.

The glass transition temperature (Tg) of the toner is preferably from 45.0° C. to 65.0° C., and more preferably from 50.0° C. to 65.0° C.

Where the glass transition temperature of the toner is in the above range, both the storage stability and the low-temperature fixability can be achieved at a high level. The glass transition temperature can be controlled by the composition of the binder resin, the type of crystalline polyester, the molecular weight of the binder resin, and the like.

The volume average particle diameter (Dv) of the toner is preferably from 3.00 μm to 9.00 μm, and more preferably from 5.00 μm to 8.00 μm.

By setting the volume average particle diameter (Dv) of the toner within the above range, it is possible to satisfy sufficiently the dot reproducibility while improving the toner handling property.

The ratio (Dv/Dn) of the volume average particle diameter (Dv) of the toner to the number average particle diameter (Dn) thereof is preferably not more than 1.25, and more preferably less than 1.25.

The Dv and Dv/Dn of the toner can be controlled by the amount of the dispersing agent, the type of the stirrer, the rotation speed, and the like.

The toner preferably has an average circularity of at least 0.960, and more preferably at least 0.970. The upper limit of the average circularity is not particularly limited, but is, for example, not more than 1.000.

By setting the average circularity within the above range, the flowability of the toner is improved, and it becomes possible to reduce toner deterioration during long-term printing. The average circularity can be controlled by the amount of the material forming the shell layer, the amount of the dispersing agent used, and the like.

The number average molecular weight (Mn) of the binder resin (B) is preferably from 5000 to 20,000, more preferably from 7000 to 20,000, even more preferably from 8000 to 20,000. When the number average molecular weight of the binder resin (B) is not more than 20,000, the low-temperature fixability tends to be improved. When the number average molecular weight of the binder resin (A) is at least 5000, the heat-resistant storage stability tends to be improved.

The weight average molecular weight (Mw) of the binder resin (B) is preferably from 10,000 to 300,000, more preferably from 15,000 to 260,000, and even more preferably from 20,000 to 230,000. When the weight average molecular weight of the binder resin (B) is not more than 300,000, the low-temperature fixability tends to be improved. When the weight average molecular weight of the binder resin (B) is at least 10,000, the heat-resistant storage stability tends to be improved.

The molecular weight distribution (Mw/Mn) of the binder resin (B) is preferably from 2 to 40, more preferably from 3 to 35, and even more preferably from 3 to 23. When the molecular weight distribution is not more than 40, the low-temperature fixability and the storage stability tend to be improved. When the molecular weight distribution is at least 2, the hot offset resistance tends to be improved.

Disclosures Regarding to Analysis

Methods for measuring physical property values according to the present disclosure are described below.

Toner Volume Average Particle Diameter Dv and Particle Diameter Distribution Dv/Dn The volume average particle diameter Dv, number average particle diameter Dn, and particle diameter distribution Dv/Dn of the toner are measured by a particle diameter measuring device (Beckman Coulter, Inc., trade name: Multisizer). The measurement with the Multisizer is performed under the conditions of an aperture diameter of 100 μm, a dispersion medium Isoton II (trade name), a concentration of 10%, and the number of measured particles of 100,000.

Specifically, 0.2 g of toner is placed in a beaker, and an alkylbenzene sulfonic acid aqueous solution (manufactured by Fujifilm Corporation, trade name: Drywell) is added to the beaker. Then, 2 mL of a dispersion medium is further added to moisten the toner, 10 mL of the dispersion medium is added, dispersion is performed for 1 minute by an ultrasonic disperser, and then the measurement is carried out with a particle diameter measuring instrument.

Method for Measuring Melting Point of Wax

A total of from 6 mg to 8 mg of wax is weighed into a sample holder, and the measurement is performed with a differential scanning calorimeter (manufactured by Seiko Instruments Inc., trade name: RDC-220) under the condition of raising the temperature from −200° C. to 1000° C. at 100° C./min to obtain a DSC curve. The peak temperature of the endothermic peak of the DSC curve is taken as the melting point.

Method for Measuring Glass Transition Temperature of Toner

The glass transition temperature of the toner is measured in accordance with ASTM D3418-97.

Specifically, 10 mg of the toner obtained by drying is precisely weighed and placed in an aluminum pan. An empty aluminum pan is used as a reference. Using a differential scanning calorimeter (manufactured by SII NanoTechnology Inc., trade name: DSC6220), the glass transition temperature of the toner, which has been precisely weighed, is measured according to ASTM D 3418-97 is measured in a temperature range of from 0° C. to 150° C. under the condition that the temperature rising rate is 10° C./min.

Method for Measuring Weight Average Molecular Weight (Mw) and Peak Molecular Weight (Mp) of Resin etc.

The weight average molecular weight (Mw) and peak molecular weight (Mp) of the resin are measured in the following manner by using gel permeation chromatography (GPC).

(1) Preparation of Measurement Sample

A sample and tetrahydrofuran (THF) are mixed to a concentration of 5.0 mg/mL, the mixture is allowed to stand at room temperature for from 5 hours to 6 hours and then shaken thoroughly, and the THF and the sample are mixed well until there are no coalesced bodies of the sample. The mixture was further allowed to stand for at least 12 hours at room temperature. The time from the start of the mixing of the sample and THF to the end of the standing is set to at least 72 hours to obtain a tetrahydrofuran (THF)-soluble component of the sample.

After that, a sample solution is obtained by filtering with a solvent resistant membrane filter (pore size from 0.45 μm to 0.50 μm, Maishori Disc H-25-2, manufactured by Tosoh Corporation).

(2) Measurement of Sample

The measurement is conducted under the following conditions by using the obtained sample solution.

Device: high-speed GPC device LC-GPC 150C (manufactured by Waters Corp.) Column: 7 sets of Shodex GPC KF-801, 802, 803, 804, 805, 806, 807 (manufactured by Showa Denko KK)

Mobile phase: THF

Flow rate: 1.0 mL/min

Column temperature: 40° C.

Sample injection volume: 100 μL

Detector: RI (refractive index) detector

When measuring the molecular weight of a sample, the molecular weight distribution of the sample is calculated from the relationship between the count number and the logarithmic value of a calibration curve prepared using several types of monodisperse polystyrene standard samples.

Standard polystyrene samples to be used for creating the calibration curve are manufactured by Pressure Chemical Co. or Toyo Soda Kogyo Co., Ltd. and have a molecular weight of $6.0 \times 10^2$, $2.1 \times 10^3$, $4.0 \times 10^3$, $1.75 \times 10^4$, $5.1 \times 10^4$, $1.1 \times 10^5$, $3.9 \times 10^5$, $8.6 \times 10^5$, $2.0 \times 10^6$, and $4.48 \times 10^6$.

Method for Measuring Occupied Area of Wax Domains in Cross Section of Toner Using Transmission Electron Microscope Cross section observation of the toner with a transmission electron microscope (TEM) and evaluation of wax domains are performed in the following manner.

Crystalline material can be obtained with a clear contrast by ruthenium staining of toner cross section. Crystalline materials stain weaker than amorphous materials. This is apparently because the staining material penetrates into the crystalline material weaker than into the amorphous material due to the difference in density and the like.

The amount of ruthenium atoms varies depending on the intensity of staining, so there are many ruthenium atoms in a strongly stained portion, an electron beam is hardly transmitted, and the portion becomes black on the observation image. Meanwhile, in a weakly stained portion, there are few ruthenium atoms, the electron beam easily penetrates, and the portion becomes white on the observation image. Further, among the crystalline materials contained in the toner, a high-molecular crystal such as a crystalline polyester and a low-molecular crystal such as wax can be distinguished by the crystal structure. Specifically, in the case of a high-molecular crystal, a lamella structure is confirmed on the observation image, and in the case of a low-molecular crystal, the lamella structure is not confirmed on the observation image.

After applying an osmium film (5 nm) and a naphthalene film (20 nm) to the toner as protective films using an osmium plasma coater (Filgen, Inc., OPC80T), and encapsulating the toner in a photocurable resin D800 (JEOL Ltd.), a sonic ultramicrotome (Leica, UC7) is used at a cutting speed of 1 mm/s to produce a toner cross section with a film thickness of 60 nm.

The obtained cross section is stained for 15 minutes in a $RuO_4$ gas atmosphere of 500 Pa by using a vacuum electron staining device (VSC4R1H, manufactured by Filgen, Inc.), and STEM observation is performed using a STEM mode of a TEM (manufactured by JEOL Ltd., JEM2800).

The STEM probe size is 1 nm, and the image size is 1024 pixels×1024 pixels.

The image obtained is binarized (threshold value of 120/255) using image processing software "Image-Pro Plus" (manufactured by Media Cybernetics, Inc.). The crystal domains can be extracted by binarizing. It should be noted that crystals that cross a boundary of 0.1 μm from the surface of the toner (present on the boundary) are not measured.

A line is drawn which partitions a region within 0.1 μm inward of the surface of the toner particle (contour of the cross section), a sum total Ws of areas occupied by the domains of the wax in a region (region within 0.1 μm from the contour of the cross section) bounded by the contour of the cross section of the toner particle and the line that partitions a region within 0.1 μm inward of the contour of the cross section, and a sum total of areas Wc occupied by the domains of the wax in an internal region (an internal region 0.1 μm inward of the contour of the cross section) inward of the line that partitions a region 0.1 μm inward of the contour of the cross section are calculated. Then, a sum total Wp of areas occupied by the domains of the wax in the entire cross section is calculated, and the ratio of Ws to Wp and the ratio of Ws to Wc are calculated. The arithmetic mean value of cross sections of 20 particles of toner is used.

Method for Measuring Average Circularity of Toner

The average circularity of the toner is measured using a flow-type particle image analyzer "FPIA-3000" (manufactured by Sysmex Corporation) under the measurement and analysis conditions during calibration work.

The specific measurement method is as follows.

First, about 20 mL of ion-exchanged water from which solid impurities and the like have been removed in advance is poured in a glass container. About 0.2 mL of a diluent obtained by diluting "Contaminon N" (a 10% by mass aqueous solution of a neutral detergent for washing precision measuring instruments which has pH 7 and is composed of a nonionic surfactant, anionic surfactant, and an organic builder, manufactured by Wako Pure Chemical Industries, Ltd.) with ion-exchanged water to about three times by mass is added as a dispersing agent thereto.

Approximately 0.02 g of the measurement sample is further added, and dispersion treatment is performed for 2 minutes using an ultrasonic disperser to prepare a dispersion liquid for measurement. At that time, cooling is performed, as appropriate, so that the temperature of the dispersion liquid becomes from 10° C. to 40° C. As the ultrasonic disperser, a tabletop ultrasonic cleaner disperser "VS-150" (manufactured by VELVO-CLEAR Co.) having an oscillation frequency of 50 kHz and an electric output of 150 W is used, a predetermined amount of ion-exchanged water is placed in a water tank, and about 2 mL of Contaminon N is added to the water tank.

A flow-type particle image analyzer equipped with "LUCPLFLN" (20× magnification, numerical aperture 0.40) as an objective lens is used for the measurement, and the particle sheath "PSE-900A" (manufactured by Sysmex Corporation) is used as the sheath liquid. The dispersion liquid prepared according to the aforementioned procedure is introduced into the flow-type particle image analyzer, and 2000 magnetic toner particles are measured in an HPF measurement mode and a total count mode. The average circularity of the toner is calculated from the result.

Method for Measuring Secondary Ion Intensity by Time-of-Flight Secondary Ion Mass Spectrometry (TOF-SIMS)

NanoTOFII, manufactured by ULVAC-PHI, Inc., is used for peak intensity measurement using TOF-SIMS.

The analysis conditions are as follows.
Sample preparation: the toner is attached to an indium sheet
Sample preparation: none
Primary ion: bismuth trimer ion ($Bi_3^{++}$)
Accelerating voltage: 30 kV
Charge neutralization mode: On
Measurement mode: Positive, Negative
Raster: 200 μm
Measurement time: 30 s
Repetition frequency: 8.2 KHz Calculation of secondary ionic strength Ib(t) derived from the vinyl resin: according to ULVAC-PHI standard software (Win Cadense), the total count number of mass numbers from 84.5 to 85.5 is taken as Ib(t).

Calculation of secondary ionic strength Iw(t) derived from the wax: according to ULVAC-PHI standard software (Win Cadense), the total count number of mass numbers from 282.5 to 283.5 is taken as Iw(t).

Normally, TOF-SIMS is a surface analysis method and the data in the depth direction are for about 1 nm. Therefore, the secondary ion intensity inside the toner is obtained by sputtering the toner with argon gas cluster ions and scraping the surface.

The sputtering conditions are as follows.
Accelerating voltage: 10 kV
Current: 13 nA
Raster: 600 μm
Irradiation time: 5 s For the depth measurement, the relationship between the irradiation time and the depth to be removed was confirmed by sputtering the PMMA film under the same conditions in advance, and it was confirmed that it was possible to remove 100 nm in 300 s.

The secondary ion intensity at 10 nm from the toner surface is the value of secondary ion mass/secondary ion charge number (m/z) measured when sputtering was performed six times under the above conditions.

Further, the secondary ion intensity at the outermost surface of the toner (that is, at t=0) is the value of secondary ion mass/secondary ion charge number (m/z) measured without performing toner sputtering.

Method for Specifying Structures of Binder Resin (A) and Monoester Compound Represented by Formula (3) and Method for Measuring Molar Ratio of Structure Represented by Formula (1) and Structure Represented by Formula (2) in Binder Resin (A)

The structures of the binder resin (A) and the monoester compound represented by the formula (3), and the molar ratio of the structure represented by the formula (1) and the structure represented by the formula (2) in the binder resin (A) are specified by nuclear magnetic resonance spectroscopy ($^1$H-NMR) [400 MHz, $CDCl_3$, room temperature (25° C.)].

Measuring device: FT NMR device JNM-EX400 (made by JEOL Ltd.)
Measurement frequency: 400 MHz
Pulse condition: 5.0 μs
Frequency range: 10,500 Hz
Total number of times: 64 times
Solvent: a deuterated solvent that dissolves the toner is used as appropriate Method for Specifying Shell Layer Structure The structure of the shell layer is specified by $^1$H-NMR as in the method for specifying the structures of the binder resin (A) and the monoester compound represented by the formula (3).

A total of 10 mg of toner is immersed in a solvent, allowed to stand for 1 minute, and filtered, and the filtrate is used as a measurement sample.

Method of Measuring Amount of Wax

The endothermic amount ΔH1 (J/g) derived from the wax in the above-described method for measuring the glass transition temperature of the toner is calculated.

Further, the endothermic amount of the wax alone is measured under the same conditions to obtain the endothermic amount ΔH2 (J/g).

The wax amount (% by mass) is calculated from ΔH1/ΔH2×100.

EXAMPLES

The present disclosure will be specifically described hereinbelow with reference to examples, but the present disclosure is not limited to these examples. The numbers of parts in the examples are based on mass unless otherwise specified.

Production Example of Binder Resin (A) 1

Diol (10.6 parts) represented by a following formula (21),

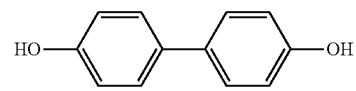

(21)

diol (39.4 parts) represented by a following formula (22),

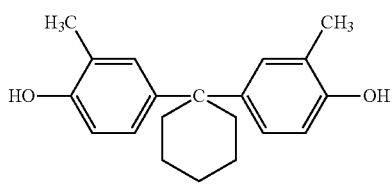

(22)

and 0.1 part of hydrosulfite were dissolved in 1100 parts of 5% by mass sodium hydroxide aqueous solution. To this, 500 parts of methylene chloride was added, and 60.0 parts of phosgene was then blown in over 60 minutes while stirring and maintaining the temperature at 15° C.

After the completion of blowing phosgene, 1.0 part of p-t-butylphenol as a molecular weight modifier was added and stirred to emulsify the reaction liquid. After the emulsification, 0.3 parts of triethylamine was added, and the mixture was stirred at 23° C. for 1 hour for polymerization.

After completion of the polymerization, the reaction solution was separated into an aqueous phase and an organic phase, the organic phase was neutralized with phosphoric acid, and washing with water was repeated until the conductivity of the washing solution (aqueous phase) was not more than 10 μS/cm. The obtained polymer solution was added dropwise to warm water kept at 45° C., and the solvent was removed by evaporation to obtain a white powdery precipitate. The obtained precipitate was filtered and dried at 110° C. for 24 hours to obtain a binder resin (A) 1.

As a result of confirming the obtained binder resin (A) 1 by $^1$H-NMR, the binder resin (A) 1 included 30 mol % of the structure represented by the formula (1) and 70 mol % of the structure represented by the formula (2).

Production Examples of Binder Resins (A) 2 to 6

Binder resins (A) 2 to 6 were produced in the same manner as in the production example of the binder resin (A) 1, except that the type of diol used was changed so that R11 in the formula (1) and R21 in the formula (2) were as shown in Table 1, and the molar ratio and amount of the structure represented by formula (1) and the structure represented by the formula (2) were changed as shown in Table 1.

Production Example of Photosensitive Member 1

A total of 3.0 parts of a metal-free phthalocyanine pigment as a charge generation substance, 60.0 parts of a compound represented by a following formula (23) as a charge transport substance,

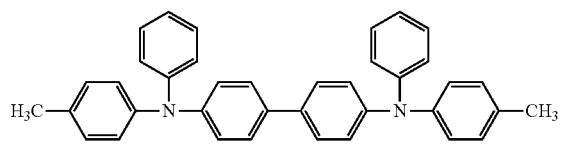

(23)

12.0 parts of a compound represented by a following formula (24) and 28.0 parts of a compound represented by a following formula (25) as electron transport substances,

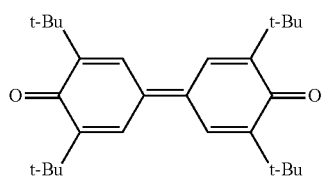

(24)

(Where, t-Bu represents a t-butyl group.)

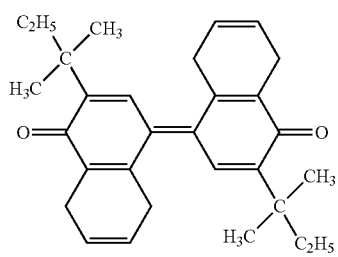

(25)

100 parts of the binder resin (A) 1 as a binder resin, and 800 parts of tetrahydrofuran as a solvent were charged into a container.

Using a rod-shaped ultrasonic disperser, the material in the container and the solvent were mixed for 2 minutes to disperse the material in the solvent. Further, the material and the solvent were mixed for 50 hours using a ball mill, and the material was dispersed in the solvent to prepare a photosensitive layer coating liquid.

This photosensitive layer coating liquid was dip-coated on an aluminum support as a conductive substrate and dried at 100° C. for 40 minutes to obtain a photosensitive member 1 having a film thickness of 25 μm and a single-layer type photosensitive layer. The single-layer type photosensitive layer corresponds to the surface layer of the photosensitive member 1.

Method for Producing Photosensitive Members 2 to 6

Photosensitive members 2 to 6 were produced in the same manner as in the method for producing the photosensitive member 1, except that the binder resin (A) 1 was changed as shown in Table 1. Each of the photosensitive members 2 to 6 has a single-layer photosensitive layer, and each single-layer photosensitive layer corresponds to the surface layer of each photosensitive member.

TABLE 1

| | | | | | | |
|---|---|---|---|---|---|---|
| | | Composition and physical properties of binder resin (A) | | | | |
| Photosensitive member No. | Binder resin No | $R_{11}$ in formula (1) | $R_{21}$ in formula (2) | $R_{22}$, $R_{23}$ in formula (2) | Formula (1):formula (2) (molar ratio) | Weight average molecular weight Mw |
| 1 | (A)1 | H | $CH_3$ | Cyclohexylidene | 30:70 | 30000 |
| 2 | (A)2 | H | H | (formed by linking | 30:70 | 31000 |
| 3 | (A)3 | $CH_3$ | H | $R_{22}$, $R_{23}$, | 30:70 | 30000 |
| 4 | (A)4 | $CH_3$ | $CH_3$ | and C between | 30:70 | 32000 |
| 5 | (A)5 | H | $CH_3$ | $R_{22}$ and $R_{23}$) | 65:35 | 36000 |
| 6 | (A)6 | H | $CH_3$ | | 20:80 | 30000 |

Method for Producing Photosensitive Member 7

A total of 3.0 parts of a metal-free phthalocyanine pigment as a charge generation substance, 60.0 parts of a compound represented by the formula (23) as a charge transport substance, 12.0 parts of a compound represented by a following formula (24) and 28.0 parts of a compound represented by a following formula (25) as electron transport substances, 1.0 part of silica particles surface-treated with hexamethyldisilazane as an additive (Aerosil RX200, manufactured by Nippon Aerosil Co., Ltd.), 100 parts of the binder resin (A) 2 as a binder resin, and 800 parts of tetrahydrofuran as a solvent were charged into a container.

Using a rod-shaped ultrasonic disperser, the material in the container and the solvent were mixed for 2 minutes to disperse the material in the solvent. Further, the material and the solvent were mixed for 50 hours using a ball mill, and the material was dispersed in the solvent to prepare a photosensitive layer coating liquid.

This photosensitive layer coating liquid was dip-coated on an aluminum support as a conductive substrate and dried at 100° C. for 40 minutes to obtain a photosensitive member 7 having a film thickness of 25 μm and a single-layer type photosensitive layer. The single-layer type photosensitive layer corresponds to the surface layer of the photosensitive member 7.

Method for Producing Wax W1

A total of 100 parts of behenyl alcohol as an alcohol monomer and 80 parts of stearic acid as a carboxylic acid monomer were added to a reaction vessel equipped with a thermometer, a nitrogen inlet tube, a stirrer, a Dean-Stark trap and a Dimroth cooling tube, and an esterification reaction was carried out at 200° C. for 15 hours.

A total of 20 parts of toluene and 25 parts of isopropanol were added to the obtained ester compound, 190 parts of a 10% aqueous potassium hydroxide solution in an amount corresponding to 1.5 times the acid value of the ester compound was added, and the mixture was stirred at 70° C. for 4 hours. Then, the water tank part was removed. After further adding 20 parts of ion-exchanged water and stirring at 70° C. for 1 hour, the water tank part was removed and washing was performed. The above washing step was repeated until the pH of the removed aquarium became neutral.

After that, the solvent was removed under reduced pressure at 200° C. and 1 kPa to obtain behenyl stearate (wax W1) which is a monoester compound of behenyl alcohol and stearic acid and is a final target product. Table 1 shows the physical properties of the obtained wax W1.

Method for Producing Waxes W2 to W6

Waxes W2 to W6 were obtained in the same manner as in the method for producing wax W1 except that the monomers were changed as shown in Table 1. Table 2 shows the physical properties of the obtained waxes W2 to W6.

TABLE 2

| | | | Wax | |
|---|---|---|---|---|
| | Alcohol monomer | Carboxylic acid monomer | Wax type | Melting point (° C.) |
| W1 | Behenyl alcohol | Stearic acid | Behenyl stearate | 70 |
| W2 | Eicosyl alcohol | Eicosanic acid | Eicosyl eicosanate | 66 |
| W3 | Stearyl alcohol | Behenic acid | Stearyl behenate | 73 |
| W4 | Behenyl alcohol | Behenic acid | Behenyl behenate | 70 |
| W5 | Pentaerythritol | Stearic acid | Pentaerythritol tetrastearate | 76 |
| W6 | — | — | Paraffin wax (HNP-9, manufactured by Nippon Seiro Co., Ltd.) | 75 |

Method for Producing Polyester 1

| | |
|---|---|
| Terephthalic acid | 64.0 parts |
| Trimellitic acid | 2.0 parts |
| Bisphenol A ethylene oxide (2 mol) adduct | 90.0 parts |
| Bisphenol A propylene oxide (2 mol) adduct | 10.0 parts |
| Dibutyltin oxide | 0.1 parts |

The above materials were placed in a heat-dried two-necked flask, nitrogen gas was introduced into the container to keep an inert atmosphere, and the temperature was raised under stirring. Thereafter, a polycondensation reaction was carried out at from 150° C. to 230° C. for about 12 hours, and then the pressure was gradually reduced at from 210° C. to 250° C. to obtain a polyester 1.

The polyester 1 had a number average molecular weight (Mn) of 18,200, a weight average molecular weight (Mw) of 74,100, and a glass transition temperature (Tg) of 58.6° C.

Method for Producing Toner 1

| | |
|---|---|
| Polymerizable monomers: styrene 74 parts, n-butyl acrylate | 26 parts |
| Colorant: carbon black (manufactured by Mitsubishi Chemical Corp., trade name: #25B) | 7 parts |
| Crosslinking agent: divinylbenzene | 0.74 parts |
| Charge control agent: styrene/acrylic resin (manufactured by Fujikura Kasei Co., Ltd., trade name: FCA-592P) | 0.37 parts |
| Molecular weight modifier: tetraethyl thiuram disulfide | 1 part |
| Macromonomer: polymethacrylic acid ester macromonomer (manufactured by Toagosei Chemical Industry Co., Ltd., trade name: AA6, Tg = 94° C.) | 0.25 part |

After stirring and mixing the above materials with a usual stirring device, the components were uniformly dispersed with a media type disperser and heated to 63° C.

A total of 20 parts of the wax W1 was added, mixed, and dissolved therein to obtain a polymerizable monomer composition.

Meanwhile, an aqueous solution prepared by dissolving 4.1 parts of sodium hydroxide in 50 parts of ion-exchanged water was gradually added under stirring to an aqueous solution prepared by dissolving 7.4 parts of magnesium chloride in 250 parts of ion-exchanged water in a stirring tank at room temperature to prepare magnesium hydroxide colloidal dispersion liquid (3.0 parts of magnesium hydroxide).

The above polymerizable monomer composition was added at room temperature to the magnesium hydroxide colloidal dispersion obtained as described above, the temperature was raised to 60° C., the mixture was stirred until the droplets became stable, 5 parts of t-butylperoxy-2-ethylhexanoate (manufactured by NOF Corp., trade name: Perbutyl O) was added as a polymerization initiator thereto, an in-line emulsification disperser (manufactured by Taiheiyo Kiko Co., Ltd., trade name: MILDER) was used to perform high-shear stirring at a revolution speed of 15,000 rpm and form droplets of a polymerizable monomer composition.

The magnesium hydroxide colloidal dispersion liquid in which the droplets of the polymerizable monomer composition were dispersed was put into a reactor equipped with an impeller, the temperature was raised to 89° C. and controlled to be constant, and a polymerization reaction was performed. Then, when the polymerization conversion rate reached 98%, the system temperature was lowered to 75° C., and 15 minutes after reaching 75° C., 3 parts of methyl methacrylate as a polymerizable monomer for the shell and 0.36 parts of 2,2'-azobis[2-methyl-N-(1,1-bis(hydroxymethyl)2-hydroxyethyl)propionamide] tetrahydrate (manufactured by Wako Pure Chemical Industries, Ltd., trade name: VA086) dissolved in 10 parts of ion-exchanged water were added. After the polymerization was further continued for 3 hours, the reaction was stopped to obtain an aqueous dispersion of colored resin particles having a pH of 9.5.

After that, the aqueous dispersion of the colored resin particles was heated to 80° C., stripped at a nitrogen gas flow rate of 0.6 m³/(hr·kg) for 5 hours, and then cooled to 25° C. Next, while stirring the resulting aqueous dispersion at 25° C., the system pH was set to not more than 6.5 with sulfuric acid, acid washing is performed, water was separated by filtration, and then 500 parts of ion-exchanged water was newly added to perform re-slurrying and washing with water. After that, dehydration and water washing were repeated several times to separate the solid fraction by filtration, and then the solid fraction was placed in a drier and dried at a temperature of 40° C. for 12 hours to obtain toner particles 1.

To the toner particles 1 (100 parts) obtained as described above, 0.7 parts of hydrophobized silica fine particles having a number average primary particle diameter of 7 nm and 1 part of hydrophobized silica fine particles having a number average primary particle diameter of 50 nm were added, and mixing was performed using a high-speed stirrer (trade name: FM Mixer, manufactured by Nippon Coke Industry Co., Ltd.) to produce a toner 1. Table 4 shows the physical properties of the toner 1 thus obtained.

Method for Producing Toner 2

| | |
|---|---|
| Polymerizable monomers: styrene 74 parts, n-butyl acrylate | 26 parts |
| Colorant: carbon black (Mitsubishi Chemical Corp., trade name: #25B) | 7 parts |
| Crosslinking agent: divinylbenzene | 0.74 parts |
| Charge control agent: styrene/acrylic resin (manufactured by Fujikura Kasei Co., Ltd., trade name: FCA-592P) | 0.50 parts |
| Molecular weight modifier: tetraethyl thiuram disulfide | 1 part |
| Macromonomer: polymethacrylic acid ester macromonomer (manufactured by Toagosei Chemical Industry Co., Ltd., trade name: AA6, Tg = 94° C.) | 0.17 parts |

After stirring and mixing the above materials with a usual stirring device, the components were uniformly dispersed with a media type disperser and heated to 63° C.

A total of 20 parts of the wax W1 was added, mixed, and dissolved therein to obtain a polymerizable monomer composition.

Meanwhile, an aqueous solution prepared by dissolving 4.1 parts of sodium hydroxide in 50 parts of ion-exchanged water was gradually added under stirring to an aqueous solution prepared by dissolving 7.4 parts of magnesium chloride in 250 parts of ion-exchanged water in a stirring tank at room temperature to prepare magnesium hydroxide colloidal dispersion liquid (3.0 parts of magnesium hydroxide).

The above polymerizable monomer composition was added at room temperature to the magnesium hydroxide colloidal dispersion obtained as described above, the temperature was raised to 60° C., the mixture was stirred until the droplets became stable, 5 parts of t-butylperoxy-2-ethylhexanoate (manufactured by NOF Corp., trade name: Perbutyl O) was added as a polymerization initiator thereto, an in-line emulsification disperser (manufactured by Taiheiyo Kiko Co., Ltd., trade name: MILDER) was used to perform high-shear stirring at a revolution speed of 15,000 rpm and form droplets of a polymerizable monomer composition.

The magnesium hydroxide colloidal dispersion liquid in which the droplets of the polymerizable monomer composition were dispersed was put into a reactor equipped with an impeller, the temperature was raised to 89° C. and controlled to be constant, and a polymerization reaction was performed. Then, when the polymerization conversion rate reached 98%, the system temperature was lowered to 75° C., and 15 minutes after reaching 75° C., 2 parts of methyl methacrylate as a polymerizable monomer for the shell and 0.36 parts of 2,2'-azobis[2-methyl-N-(1,1-bis(hydroxymethyl)2-hydroxyethyl)propionamide] tetrahydrate (manufactured by Wako Pure Chemical Industries, Ltd., trade name: VA086) dissolved in 10 parts of ion-exchanged water were added. After the polymerization was further continued for 3 hours, the reaction was stopped to obtain an aqueous dispersion of colored resin particles having a pH of 9.5.

After that, the aqueous dispersion of the colored resin particles was heated to 80° C., stripped at a nitrogen gas flow rate of 0.6 m$^3$/(hr·kg) for 5 hours, and then cooled to 25° C. Next, while stirring the resulting aqueous dispersion at 25° C., the system pH was set to not more than 6.5 with sulfuric acid, acid washing is performed, water was separated by filtration, and then 500 parts of ion-exchanged water was newly added to perform re-slurrying and washing with water. After that, dehydration and water washing were repeated several times to separate the solid fraction by filtration, and then the solid fraction was placed in a drier and dried at a temperature of 40° C. for 12 hours to obtain toner particles 2.

To the toner particles 2 (100 parts) obtained as described above, 0.7 parts of hydrophobized silica fine particles having a number average primary particle diameter of 7 nm and 1 part of hydrophobized silica fine particles having a number average primary particle diameter of 50 nm were added, and mixing was performed using a high-speed stirrer (trade name: FM Mixer, manufactured by Nippon Coke Industry Co., Ltd.) to produce a toner 2. Table 4 shows the physical properties of the toner 2 thus obtained.

Method for Producing Toners 3 to 10, 12, and 13

Toners 3 to 10, 12, and 13 were manufactured in the same manner as in the method for producing the toner 1, except that the type and amount of wax used were changed as shown in Table 3. Table 4 shows the physical properties of toners 3 to 10, 12, and 13.

Method for Producing Toner 11

The following materials were mixed with an FM mixer ("FM-20" manufactured by Nippon Coke Industry Co., Ltd.) for 4 minutes under the condition of a rotation speed of 2000 rpm.

| | |
|---|---|
| Polyester 1 | 90 parts |
| Charge control agent ("FAC-207P", manufactured by Fujikura Kasei Co., Ltd.) | 3 parts |
| Carbon black (Mitsubishi Chemical Corp., trade name: #25B) | 4 parts |
| Wax W1 | 3 parts |

The obtained mixture was melt-kneaded by a twin-screw extruder ("PCM-30" manufactured by Ikegai Co., Ltd.) under the conditions of a melt-kneading temperature (cylinder temperature) of 120° C., a rotation speed of 150 rpm, and a processing speed of 100 g/min. The obtained melt-kneaded product was coarsely pulverized to about 2 mm by a Rotoplex pulverizer (manufactured by Alpine AG) and pulverized by a mechanical pulverizer ("Turbomill T250" manufactured by Freund Turbo Co., Ltd.). The obtained pulverized product was classified by an air classifier ("EJ-L3 type" manufactured by Nittetsu Mining Co., Ltd.) to obtain toner particles 11 having an average particle diameter of 8.5 µm.

A total of 100 parts of the resulting toner particles 11, 0.8 parts of silica fine particles ("RA200" manufactured by Nippon Aerosil Co., Ltd.), and 0.8 parts of titanium oxide ("EC100" manufactured by Titanium Industry Co., Ltd.) were mixed with an FM mixer ("FM-20" manufactured by Nippon Coke Industry Co., Ltd.) for 5 minutes under the condition of a rotation speed of 2000 rpm to obtain a toner 11.

Table 4 shows the physical properties of the toner 11.

TABLE 3

| Toner No. | Wax | |
|---|---|---|
| | Wax No. | Parts |
| 1 | W1 | 20.0 |
| 2 | W1 | 20.0 |
| 3 | W1 | 26.6 |
| 4 | W1 | 1.5 |
| 5 | W1 | 0.8 |
| 6 | W1 | 25.0 |
| 7 | W1 | 30.0 |
| 8 | W2 | 20.0 |
| 9 | W3 | 20.0 |
| 10 | W4 | 20.0 |
| 12 | W5 | 20.0 |
| 13 | W6 | 20.0 |

TABLE 4

| Toner No. | Volume average particle diameter Dv(µm) | Particle size distribution Dv/Dn | Average circulatory | Ws/Wp (%) | Ws/Wc (%) | Iw(t) | Ib(t) | Amount of wax (% by mass) |
|---|---|---|---|---|---|---|---|---|
| 1 | 7.7 | 1.12 | 0.980 | 2.0 | 0.20 | 0.001 | 0.025 | 14.7 |
| 2 | 8.1 | 1.18 | 0.968 | 2.0 | 0.20 | 0.003 | 0.025 | 14.4 |
| 3 | 7.8 | 1.11 | 0.981 | 6.0 | 0.20 | 0.004 | 0.020 | 18.6 |
| 4 | 7.7 | 1.12 | 0.985 | 0.0 | 0.00 | 0.001 | 0.025 | 1.3 |
| 5 | 7.7 | 1.11 | 0.984 | 0.0 | 0.00 | 0.001 | 0.025 | 0.7 |
| 6 | 7.7 | 1.11 | 0.981 | 7.0 | 0.20 | 0.007 | 0.020 | 17.7 |
| 7 | 7.8 | 1.12 | 0.980 | 11.0 | 0.28 | 0.015 | 0.015 | 20.5 |
| 8 | 7.7 | 1.13 | 0.983 | 2.0 | 0.20 | 0.001 | 0.025 | 14.7 |
| 9 | 7.8 | 1.12 | 0.984 | 2.0 | 0.20 | 0.001 | 0.025 | 14.7 |
| 10 | 7.8 | 1.12 | 0.983 | 2.0 | 0.20 | 0.001 | 0.025 | 14.7 |
| 11 | 8.5 | 1.20 | 0.949 | 0.6 | 0.60 | — | — | 3.0 |
| 12 | 7.7 | 1.11 | 0.983 | 2.0 | 0.20 | 0.001 | 0.025 | 14.7 |
| 13 | 7.7 | 1.11 | 0.983 | 2.0 | 0.20 | 0.001 | 0.025 | 14.7 |

TABLE 5

| | | Toner | | Photosensitive member | | Solubility parameter of wax | | Affinity for binder resin (B) | | Affinity for structure represented by formula (1) | | Affinity for structure represented by formula (2) | |
|---|---|---|---|---|---|---|---|---|---|---|---|---|---|
| | | No | Wax | No | Binder resin | SD2 | SP2 | SD1-SD2 | SP1-SP2 | SD(A1)-SD2 | SP(A1)-SP2 | SD(A2)-SD2 | SP(A2)-SP2 |
| Example | 1 | 1 | W1 | 1 | (A) 1 | 16.00 | 1.00 | 2.20 | 0.20 | 4.40 | 5.90 | 3.20 | 2.90 |
| | 2 | 1 | W1 | 2 | (A) 2 | 16.00 | 1.00 | 2.20 | 0.20 | 4.40 | 5.90 | 3.50 | 4.20 |
| | 3 | 1 | W1 | 3 | (A) 3 | 16.00 | 1.00 | 2.20 | 0.20 | 3.70 | 4.00 | 3.50 | 4.20 |
| | 4 | 1 | W1 | 4 | (A) 4 | 16.00 | 1.00 | 2.20 | 0.20 | 3.70 | 4.00 | 3.20 | 2.90 |
| | 5 | 2 | W1 | 2 | (A) 2 | 16.00 | 1.00 | 2.20 | 0.20 | 4.40 | 5.90 | 3.50 | 4.20 |
| | 6 | 3 | W1 | 2 | (A) 2 | 16.00 | 1.00 | 2.20 | 0.20 | 4.40 | 5.90 | 3.50 | 4.20 |
| | 7 | 4 | W1 | 2 | (A) 2 | 16.00 | 1.00 | 2.20 | 0.20 | 4.40 | 5.90 | 3.50 | 4.20 |
| | 8 | 5 | W1 | 2 | (A) 2 | 16.00 | 1.00 | 2.20 | 0.20 | 4.40 | 5.90 | 3.50 | 4.20 |
| | 9 | 6 | W1 | 2 | (A) 2 | 16.00 | 1.00 | 2.20 | 0.20 | 4.40 | 5.90 | 3.50 | 4.20 |
| | 10 | 7 | W1 | 2 | (A) 2 | 16.00 | 1.00 | 2.20 | 0.20 | 4.40 | 5.90 | 3.50 | 4.20 |
| | 11 | 1 | W1 | 5 | (A) 5 | 16.00 | 1.00 | 2.20 | 0.20 | 4.40 | 5.90 | 3.20 | 2.90 |
| | 12 | 8 | W2 | 2 | (A) 2 | 16.00 | 1.10 | 2.20 | 0.10 | 4.40 | 5.80 | 3.50 | 4.10 |
| | 13 | 9 | W3 | 2 | (A) 2 | 16.00 | 1.00 | 2.20 | 0.20 | 4.40 | 5.90 | 3.50 | 4.20 |
| | 14 | 10 | W1 | 5 | (A) 5 | 16.00 | 1.00 | 2.20 | 0.20 | 4.40 | 5.90 | 3.20 | 2.90 |
| | 15 | 1 | W1 | 7 | (A) 2 | 16.00 | 1.00 | 2.20 | 0.20 | 4.40 | 5.90 | 3.50 | 4.20 |
| | 16 | 1 | W1 | 6 | (A) 6 | 16.00 | 1.00 | 2.10 | 0.10 | 4.30 | 5.80 | 3.40 | 4.10 |
| Comparative Example | 1 | 11 | W1 | 2 | (A) 2 | 16.00 | 1.00 | 2.20 | 0.20 | 4.40 | 5.90 | 3.50 | 4.20 |
| | 2 | 12 | W5 | 4 | (A) 4 | 18.20 | 1.70 | 0.00 | −0.50 | 1.50 | 3.30 | 1.00 | 2.20 |
| | 3 | 12 | W5 | 2 | (A) 2 | 18.20 | 1.70 | 0.00 | −0.50 | 2.20 | 5.20 | 1.30 | 3.50 |
| | 4 | 13 | W5 | 2 | (A) 2 | 16.10 | 0.00 | 2.10 | 1.20 | 4.30 | 6.90 | 3.40 | 5.20 |
| | 5 | 13 | W6 | 4 | (A) 4 | 16.10 | 0.00 | 2.10 | 1.20 | 3.60 | 5.00 | 3.10 | 3.90 |

Example 1

The following evaluation was carried out with the combination of the toner 1 and the photosensitive member 1.
Table 6 shows the evaluation results.

TABLE 6

| Example/ Comparative Example No. | <Image sharpness> | <Image defect> | <Low-temperature fixability> (blank dot temperature) | <Storage property> (change in density) |
|---|---|---|---|---|
| Example 1 | A | A | A | A |
| Example 2 | A | A | A | A |
| Example 3 | A | A | A | A |
| Example 4 | A | A | A | A |
| Example 5 | A | A | A | B |
| Example 6 | A | B | A | B |
| Example 7 | A | A | B | A |
| Example 8 | A | A | C | A |
| Example 9 | A | C | A | C |
| Example 10 | B | C | A | C |
| Example 11 | B | A | A | A |
| Example 12 | A | A | A | A |
| Example 13 | A | A | A | A |
| Example 14 | A | A | A | A |
| Example 15 | A | A | A | A |
| Example 16 | A | B | A | A |
| Comparative Example 1 | A | D | C | D |
| Comparative Example 2 | A | D | D | B |
| Comparative Example 3 | A | D | D | B |
| Comparative Example 4 | D | A | D | A |
| Comparative Example 5 | A | A | D | A |

Evaluation 1: Evaluation of Image Sharpness

The image sharpness was evaluated by using HL-5470DW (monochrome laser printer, manufactured by Brother Industries, Ltd.) and a cartridge from which a paper dust collecting roller was removed. The evaluation was performed in a high-temperature and high-humidity environment (temperature 35.0° C., relative humidity 85%) after printing out 5000 continuous horizontal line patterns having line width 2 mm and an interval of 5 mm. The paper used was OCE RED LABEL (basis weight: 80 g/m$^2$).

The image sharpness is an index indicating whether lines of the toner carried on the electrophotographic photosensitive member are broken when printing fine lines, so that the boundaries of the printed part become rough or the lines appear blurred. The image sharpness was evaluated by printing one continuous horizontal line pattern having a line width of 2 mm and an interval of 5 mm, confirming the image with an optical microscope, and performing evaluation according to the following criteria.

A: The line is formed with a constant width without interruption.
B: The width of the line is partly disturbed but not interrupted.
C: The width of the line is disturbed as a whole, but it is not interrupted.
D: Part of the line is broken.

Evaluation 2: Evaluation of Image Defect Derived from Photosensitive Member

Image defects (blank dots) derived from the photosensitive member were evaluated by using HL-5470DW (monochrome laser printer, manufactured by Brother Industries, Ltd.) and a cartridge from which a paper dust collecting roller was removed. The evaluation was performed in a high-temperature and high-humidity environment (temperature 35.0° C., relative humidity 85%) after printing out 5000 continuous horizontal line patterns having line width 2 mm and an interval of 5 mm. The paper used was OCE RED LABEL (basis weight: 80 g/m$^2$).

After printing the above 5000 sheets, a solid image was printed and evaluated according to the following criteria.

A: There are no image defects.
B: There is a part where the density is low in the photosensitive member pitch.
C: Blank dots are present in the photosensitive member pitch.
D: Vertical streaks are present.

Evaluation 3: Evaluation of Low-temperature Fixability

The low-temperature fixability was evaluated in a normal-temperature and normal-humidity environment (temperature 25.0° C., relative humidity 60%) by using HL-5470DW (monochrome laser printer, manufactured by Brother Industries, Ltd.) and a cartridge from which a paper dust collecting roller was removed. The printer was modified to enable arbitrary setting of the fixing temperature of the fixing device in the image forming apparatus.

Using this device, the fixing temperature of the fixing device was adjusted in the range of from 180° C. to 230° C. at 5° C. intervals, FOX RIVER BOND paper (110 g/m²), which is rough paper, was used, and a solid black image was outputted at a print percentage of 100%. At this time, it was visually evaluated whether blank dots were present in the image of the solid image portion, and the lowest temperature at which the blank dots were generated was evaluated as the low-temperature fixability.

A: Blank dots occurred at less than 200° C.
B: Blank dots occurred at at least 200° C. and less than 210° C.
C: Blank dots occurred at at least 210° C. and less than 220° C.
D: Blank dots occurred at at least 220° C.

Evaluation 4: Evaluation of Storage Stability

The storage stability was evaluated by the following procedure.

HL-5470DW (monochrome laser printer, manufactured by Brother Industries, Ltd.) and a cartridge from which a paper dust collecting roller was removed were used to print out one solid image in a normal-temperature and normal-humidity environment (temperature 25.0° C., relative humidity 60%), followed by storage for 40 days in a harsh environment (temperature 40.0° C., relative humidity 95%). After the storage, one solid image was output in a normal-temperature and normal-humidity environment (temperature 25.0° C., relative humidity 60%), and the image densities before and after the storage were compared and evaluated. The density of the solid image was measured with a Macbeth reflection densitometer (manufactured by Macbeth Co.).

A: The density difference is less than 0.05.
B: The density difference is at least 0.05 and less than 0.10.
C: The density difference is at least 0.10 and less than 0.20.
D: The density difference is at least 0.20.

Examples 2 to 15, Comparative Examples 1 to 5

In Examples 2 to 15 and Comparative Examples 1 to 5, the evaluation was performed in the same manner as in Example 1, except that the combination of the toner and the photosensitive member was changed as shown in Table 5. Table 6 shows the evaluation results.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-216285, filed Nov. 29, 2019 which is hereby incorporated by reference herein in its entirety.

What is claimed is:

1. An image forming apparatus comprising:
an electrophotographic photosensitive member; and
a developing device for supplying a toner onto the electrophotographic photosensitive member, the developing device having the toner, wherein
the electrophotographic photosensitive member has a surface layer comprising a binder resin (A),
the toner has a toner particle,
the toner particle has a core-shell structure having:
a core comprising a binder resin (B) and a wax; and
a shell layer formed on a surface of the core,
the binder resin (A) has:
a structure represented by a following formula (1); and
a structure represented by a following formula (2):

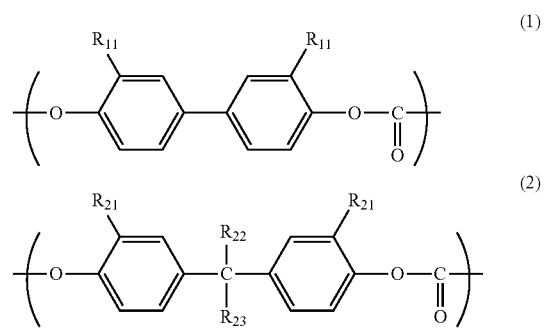

where, $R_{11}$ and $R_{21}$ each independently represent a hydrogen atom or a methyl group, $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group, the wax comprises a monoester compound represented by a following formula (3):

where, $R_{31}$ and $R_{32}$ each independently represent an alkyl group having 10 to 30 carbon atoms.

2. The image forming apparatus according to claim 1, wherein the toner has an average circularity of at least 0.960.

3. The image forming apparatus according to claim 1, wherein
in a cross section of the toner observed using a transmission electron microscope, with the wax being observed as domains, when
a sum total of areas occupied by the domains in the entire cross section is defined as Wp,
a sum total of areas occupied by the domains in a region bounded by a contour of the cross section and a line that partitions a region 0.1 μm inward of the contour of the cross section is defined as Ws, and
a sum total of areas occupied by the domains in an internal region inward of the line that partitions a region 0.1 μm inward of the contour of the cross section is defined as Wc,
a ratio of the Ws to the Wp is 0.0 to 10.0%, and
a ratio of the Ws to the Wc is 0.00 to 0.50%.

4. The image forming apparatus according to claim 1, wherein the toner contains the wax in an amount of 1.0 to 20.0% by mass.

5. The image forming apparatus according to claim 1, wherein when a dispersion term and a polar term of Hansen solubility parameters in the binder resin (B) are defined as SD1 $[(J/cm^3)^{1/2}]$ and SP1 $[(J/cm^3)^{1/2}]$, respectively, and a dispersion term and a polar term of Hansen solubility parameters in the wax are defined as SD2 $[(J/cm^3)^{1/2}]$ and SP2 $[(J/cm^3)^{1/2}]$, respectively, following formulas (4) and (5) are satisfied:

$$0.00 \leq SD1-SD2 \leq 3.00 \qquad (4)$$

$$0.00 \leq SP1-SP2 \leq 0.30 \qquad (5).$$

6. The image forming apparatus according to claim 1, wherein when a dispersion term and a polar term of Hansen solubility parameters in the wax are SD2 $[(J/cm^3)^{1/2}]$ and SP2 $[(J/cm^3)^{1/2}]$, respectively, and a dispersion term and a polar term of Hansen solubility parameters in the structure shown in the formula (2) are SD(A2) $[(J/cm^3)^{1/2}]$ and SP(A2) $[(J/cm^3)^{1/2}]$, respectively, following formulas (6) and (7) are satisfied:

$$2.50 \leq SD(A2) - SD2 \leq 5.00 \quad (6)$$

$$2.50 \leq SP(A2) - SP2 \leq 6.00 \quad (7).$$

7. The image forming apparatus according to claim 1, wherein when a dispersion term and a polar term of Hansen solubility parameters in the wax are SD2 $[(J/cm^3)^{1/2}]$ and SP2 $[(J/cm^3)^{1/2}]$, respectively, and a dispersion term and a polar term of Hansen solubility parameters in the structure shown in the formula (1) are SD(A1) $[(J/cm^3)^{1/2}]$ and SP(A1) $[(J/cm^3)^{1/2}]$, respectively, following formulas (8) and (9) are satisfied:

$$2.50 \leq SD(A1) - SD2 \leq 5.00 \quad (8)$$

$$2.50 \leq SP(A1) - SP2 \leq 6.00 \quad (9).$$

8. The image forming apparatus according to claim 1, wherein the shell layer of the toner particle comprises a vinyl resin comprising a monomer unit derived from methyl methacrylate.

9. The image forming apparatus according to claim 8, wherein
in secondary ion depth profile measurement of the surface of the toner by time-of-flight secondary ion mass spectrometry,
when secondary ion intensities derived from the wax and the vinyl resin at a depth of t (nm) from the surface of the toner are defined as Iw(t) and Ib(t), respectively, following formulas (10) and (11) are satisfied in a range of 0≤t≤10:

$$Iw(t) < Ib(t) \quad (10)$$

$$Iw(t) < 0.005 \quad (11).$$

10. The image forming apparatus according to claim 1, wherein a value of a molar ratio of the structure represented by the formula (1) to the structure represented by the formula (2) [(the structure represented by the formula (1))/(the structure represented by the formula (2))] in the binder resin (A) is 25/75 to 70/30.

11. The image forming apparatus according to claim 1, wherein the toner contains the wax in an amount of 7.0 to 13.0% by mass.

12. A process cartridge attached detachably to a main body of an image forming apparatus,
the process cartridge comprising:
an electrophotographic photosensitive member; and
a developing device for supplying a toner onto the electrophotographic photosensitive member, the developing device having the toner, wherein
the electrophotographic photosensitive member has a surface layer comprising a binder resin (A),
the toner has a toner particle;
the toner particle has a core-shell structure having:
a core comprising a binder resin (B) and a wax; and
a shell layer formed on a surface of the core,
the binder resin (A) has:
a structure represented by a following formula (1); and
a structure represented by a following formula (2):

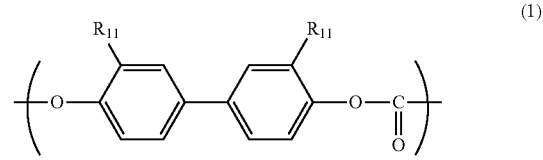

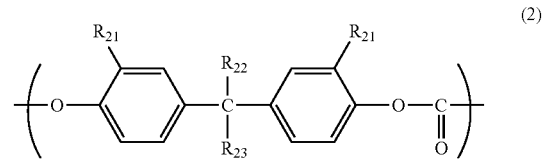

where, $R_{11}$ and $R_{21}$ each independently represent a hydrogen atom or a methyl group, $R_{22}$ and $R_{23}$ each independently represent a hydrogen atom, a methyl group, an ethyl group or a phenyl group, or $R_{22}$ and $R_{23}$ are linked to C between $R_{22}$ and $R_{23}$ shown in the formula (2) to form a cycloalkylidene group, and
the wax comprises a monoester compound represented by a following formula (3):

$$R_{31}-COO-R_{32} \quad (3)$$

where, $R_{31}$ and $R_{32}$ each independently represent an alkyl group having 10 to 30 carbon atoms.

* * * * *